(12) United States Patent
Boily et al.

(10) Patent No.: US 11,897,558 B2
(45) Date of Patent: Feb. 13, 2024

(54) TRACK SYSTEM FOR TRACTION OF A VEHICLE

(71) Applicant: CAMSO INC., Magog (CA)

(72) Inventors: Patrice Boily, Ste-Catherine-de-Hatley (CA); Matthieu Bergeron, Sherbrooke (CA); Simon Richard, Sherbrooke (CA); Ghislain Laperle, Sherbrooke (CA)

(73) Assignee: Camso Inc., Magog (CA)

( * ) Notice: Subject to any disclaimer, the term of this patent is extended or adjusted under 35 U.S.C. 154(b) by 566 days.

(21) Appl. No.: 16/989,823

(22) Filed: Aug. 10, 2020

(65) Prior Publication Data

US 2021/0024150 A1    Jan. 28, 2021

Related U.S. Application Data

(63) Continuation of application No. 15/724,733, filed on Oct. 4, 2017, now Pat. No. 11,046,377, which is a
(Continued)

(51) Int. Cl.
*B62D 55/24*    (2006.01)
*B29D 29/00*    (2006.01)
(Continued)

(52) U.S. Cl.
CPC ............ *B62D 55/244* (2013.01); *B29D 29/00* (2013.01); *B29K 2995/0087* (2013.01);
(Continued)

(58) Field of Classification Search
CPC ...... B62D 55/244; B29D 29/00; B60K 28/10; B60K 35/00; B29K 2995/0087; B29L 2029/00; B60W 2300/44
See application file for complete search history.

(56) References Cited

U.S. PATENT DOCUMENTS

| | | |
|---|---|---|
| 1,371,472 A | 3/1921 | Costello |
| 1,539,582 A | 5/1925 | Landry |
| (Continued) | | |

FOREIGN PATENT DOCUMENTS

| | | |
|---|---|---|
| CA | 2606039 A1 | 4/2009 |
| CA | 2838935 A1 | 1/2013 |
| (Continued) | | |

OTHER PUBLICATIONS

European Extended Search Report dated Aug. 18, 2021, in connection with European Patent Application No. 18887057.0, 8 pages.
(Continued)

*Primary Examiner* — Scott A Browne
(74) *Attorney, Agent, or Firm* — Hahn Loeser & Parks LLP; Bret A. Hrivnak

(57) ABSTRACT

A track for traction of a vehicle, such as an agricultural vehicle, an industrial vehicle (e.g., a construction vehicle), a military vehicle, or another off-road vehicle, is provided. The track comprises a ground-engaging outer surface for engaging the ground and a plurality of traction projections projecting from the ground-engaging outer surface and distributed in a longitudinal direction of the track. The traction projections may be designed to enhance their resistance to deterioration during use. For example, a blowout resistance of each traction projection may be enhanced to prevent or at least reduce a potential for blowout of the traction projection under repeated loads which may induce heat buildup within it. Also, a wear resistance of the traction projection may be enhanced such that the traction projection wears less rapidly. A system for protecting a track against potential occurrence of blowout is also provided.

20 Claims, 22 Drawing Sheets

Related U.S. Application Data continuation of application No. 15/555,148, filed as application No. PCT/CA2016/050234 on Mar. 4, 2016, now Pat. No. 11,167,810.

(60) Provisional application No. 62/128,183, filed on Mar. 4, 2015.

(51) Int. Cl.
  *B29L 29/00* (2006.01)
  *B60K 28/10* (2006.01)
  *B60K 35/00* (2006.01)
  *G07C 5/08* (2006.01)

(52) U.S. Cl.
  CPC .......... *B29L 2029/00* (2013.01); *B60K 28/10* (2013.01); *B60K 35/00* (2013.01); *G07C 5/0808* (2013.01); *G07C 5/0825* (2013.01)

(56) References Cited

U.S. PATENT DOCUMENTS

| | | |
|---|---|---|
| 1,673,541 A | 6/1928 | Wilson |
| 2,025,999 A | 12/1935 | Myers |
| 2,040,696 A | 5/1936 | Johnston |
| 2,369,130 A | 2/1945 | Benson |
| 2,461,150 A | 2/1949 | Flynn |
| 2,523,182 A | 9/1950 | Battaglia |
| 2,562,264 A | 7/1951 | Ford |
| 2,596,919 A | 5/1952 | Smith |
| 2,854,294 A | 9/1958 | Bannister |
| 3,019,061 A | 1/1962 | Schomers |
| 3,118,709 A | 1/1964 | Case |
| 3,464,476 A | 9/1969 | Scheuba |
| 3,582,154 A | 6/1971 | Russ, Sr. |
| 3,612,626 A | 10/1971 | Fuchs |
| 3,747,995 A | 7/1973 | Russ, Sr. |
| 3,747,996 A | 7/1973 | Huber |
| 3,767,275 A | 10/1973 | Russ, Sr. |
| 3,781,067 A | 12/1973 | Dodson et al. |
| 3,858,948 A | 1/1975 | Johnson et al. |
| 3,887,244 A | 6/1975 | Haslett et al. |
| 3,914,990 A | 10/1975 | Borg |
| 3,944,006 A | 3/1976 | Lassanske |
| 3,981,943 A | 9/1976 | Fujio et al. |
| 4,059,313 A | 11/1977 | Beyers et al. |
| RE29,718 E | 8/1978 | Reinsma et al. |
| 4,150,858 A | 4/1979 | Fox et al. |
| 4,218,101 A | 8/1980 | Thompson |
| 4,279,449 A | 7/1981 | Martin et al. |
| 4,538,860 A | 9/1985 | Edwards et al. |
| 4,583,791 A | 4/1986 | Nagata et al. |
| 4,586,757 A | 5/1986 | Bloechlinger |
| 4,587,280 A | 5/1986 | Guha et al. |
| 4,607,892 A | 8/1986 | Payne et al. |
| 4,614,508 A | 9/1986 | Kerivan |
| 4,696,520 A | 9/1987 | Henke et al. |
| 4,721,498 A | 1/1988 | Grob |
| D298,018 S | 10/1988 | Cartwright |
| 4,843,114 A | 6/1989 | Touchet et al. |
| 4,844,561 A | 7/1989 | Savage et al. |
| 4,880,283 A | 11/1989 | Savage et al. |
| 4,953,919 A | 9/1990 | Langford |
| 4,953,921 A | 9/1990 | Burns |
| 4,981,188 A | 1/1991 | Kadela |
| 5,018,591 A | 5/1991 | Price |
| 5,050,710 A | 9/1991 | Bargfrede |
| 5,117,930 A | 6/1992 | Argouarc'h |
| 5,145,242 A | 9/1992 | Togashi |
| 5,190,363 A | 3/1993 | Brittain et al. |
| 5,299,860 A | 4/1994 | Anderson |
| 5,320,585 A | 6/1994 | Kato |
| 5,352,029 A | 10/1994 | Nagorcka |
| 5,362,142 A | 11/1994 | Katoh |
| 5,368,115 A | 11/1994 | Crabb |
| 5,380,076 A | 1/1995 | Hori |
| 5,447,365 A | 9/1995 | Muramatsu et al. |
| 5,452,949 A | 9/1995 | Kelderman |
| 5,482,364 A | 1/1996 | Edwards et al. |
| 5,498,188 A | 3/1996 | Deahr |
| 5,511,869 A | 4/1996 | Edwards et al. |
| 5,513,683 A | 5/1996 | Causa et al. |
| 5,529,267 A | 6/1996 | Giras et al. |
| 5,540,489 A | 7/1996 | Muramatsu et al. |
| 5,632,537 A | 5/1997 | Yoshimura et al. |
| 5,707,123 A | 1/1998 | Grob |
| 5,722,745 A | 3/1998 | Courtemanche et al. |
| 5,813,733 A | 9/1998 | Hori et al. |
| 5,866,265 A | 2/1999 | Reilly et al. |
| 5,894,900 A | 4/1999 | Yamamoto et al. |
| 5,904,217 A | 5/1999 | Yamamoto et al. |
| 5,984,438 A | 11/1999 | Tsunoda et al. |
| 5,997,109 A | 12/1999 | Kautsch |
| 6,000,766 A | 12/1999 | Takeuchi et al. |
| 6,024,183 A | 2/2000 | Dietz et al. |
| 6,030,057 A | 2/2000 | Fikse |
| 6,056,656 A | 5/2000 | Kitano et al. |
| 6,065,818 A | 5/2000 | Fischer |
| 6,068,354 A | 5/2000 | Akiyama et al. |
| 6,074,025 A | 6/2000 | Juncker et al. |
| 6,079,802 A | 6/2000 | Nishimura et al. |
| 6,095,275 A | 8/2000 | Shaw |
| 6,120,405 A | 9/2000 | Dertley et al. |
| 6,129,426 A | 10/2000 | Tucker |
| 6,139,121 A | 10/2000 | Muramatsu |
| 6,153,686 A | 11/2000 | Granatowicz et al. |
| 6,170,925 B1 | 1/2001 | No |
| 6,176,557 B1 | 1/2001 | Ono |
| 6,186,604 B1 | 2/2001 | Fikse |
| 6,193,335 B1 | 2/2001 | Edwards |
| 6,206,492 B1 | 3/2001 | Moser |
| 6,224,172 B1 | 5/2001 | Goodwin |
| 6,241,327 B1 | 6/2001 | Gleasman et al. |
| 6,259,361 B1 | 7/2001 | Robillard et al. |
| 6,296,329 B1 | 10/2001 | Rodgers et al. |
| 6,299,264 B1 | 10/2001 | Kautsch et al. |
| 6,300,396 B1 | 10/2001 | Tsunoda et al. |
| 6,352,320 B1 | 3/2002 | Bonko et al. |
| 6,386,652 B1 | 5/2002 | Bonko |
| 6,386,653 B1 | 5/2002 | Brandenburger |
| 6,386,654 B1 | 5/2002 | Singer et al. |
| 6,416,142 B1 | 7/2002 | Dertley |
| 6,474,756 B2 | 11/2002 | Hori et al. |
| 6,494,548 B2 | 12/2002 | Courtemanche |
| 6,536,852 B2 | 3/2003 | Katayama et al. |
| 6,536,853 B2 | 3/2003 | Egle et al. |
| 6,568,769 B1 | 5/2003 | Watanabe et al. |
| 6,581,449 B1 | 6/2003 | Brown et al. |
| D476,599 S | 7/2003 | Whittington |
| 6,588,862 B1 | 7/2003 | Pringiers |
| 6,637,276 B2 | 10/2003 | Adderton et al. |
| 6,652,043 B2 | 11/2003 | Dertley |
| 6,671,609 B2 | 12/2003 | Nantz et al. |
| 6,698,850 B2 | 3/2004 | Ueno |
| D488,171 S | 4/2004 | Juncker et al. |
| 6,716,012 B2 | 4/2004 | Yovichin et al. |
| 6,733,091 B2 | 5/2004 | Deland et al. |
| 6,733,093 B2 | 5/2004 | Deland et al. |
| 6,769,746 B2 | 8/2004 | Rodgers et al. |
| 6,800,236 B1 | 10/2004 | Kurata et al. |
| 6,848,757 B2 | 2/2005 | Ueno |
| 6,874,586 B2 | 4/2005 | Boivin et al. |
| D505,136 S | 5/2005 | Brazier |
| 6,904,986 B2 | 6/2005 | Brazier |
| 6,913,329 B1 | 7/2005 | Rodgers et al. |
| 6,921,197 B2 | 7/2005 | Aubel et al. |
| 6,923,515 B2 | 8/2005 | Konickson et al. |
| 6,932,442 B2 | 8/2005 | Hori |
| 6,935,708 B2 | 8/2005 | Courtemanche |
| 6,948,784 B2 | 9/2005 | Wodrich et al. |
| 6,962,222 B2 | 11/2005 | Kirihata |
| 6,964,462 B2 | 11/2005 | Katoh et al. |
| 6,974,196 B2 | 12/2005 | Gagne et al. |
| 7,001,294 B2 | 2/2006 | Fukuda |

(56) References Cited

U.S. PATENT DOCUMENTS

| | | |
|---|---|---|
| 7,032,636 B2 | 4/2006 | Salakari |
| 7,077,216 B2 | 7/2006 | Juncker |
| D528,133 S | 9/2006 | Brazier |
| 7,114,788 B2 | 10/2006 | Deland et al. |
| 7,131,508 B2 | 11/2006 | Brazier |
| 7,137,675 B1 | 11/2006 | Simula et al. |
| 7,197,922 B2 | 4/2007 | Rimkus et al. |
| 7,202,777 B2 | 4/2007 | Tsuji et al. |
| 7,222,924 B2 | 5/2007 | Christianson |
| 7,229,141 B2 | 6/2007 | Dandurand et al. |
| 7,252,348 B2 | 8/2007 | Gingras |
| 7,293,844 B2 | 11/2007 | Uchiyama |
| D556,791 S | 12/2007 | Brazier |
| 7,316,251 B2 | 1/2008 | Kogure et al. |
| 7,325,888 B2 | 2/2008 | Fujita et al. |
| 7,367,637 B2 | 5/2008 | Gleasman |
| 7,407,236 B2 | 8/2008 | Fukushima |
| 7,413,268 B2 | 8/2008 | Kato et al. |
| 7,416,266 B2 | 8/2008 | Soucy et al. |
| 7,497,530 B2 | 3/2009 | Bessette |
| 7,567,171 B2 | 7/2009 | Dufournier |
| 7,597,161 B2 | 10/2009 | Brazier |
| D603,880 S | 11/2009 | Brazier |
| 7,625,050 B2 | 12/2009 | Bair |
| 7,676,307 B2 | 3/2010 | Schmitt et al. |
| 7,708,092 B2 | 5/2010 | Despres |
| 7,729,823 B2 | 6/2010 | Ruoppolo |
| 7,740,094 B2 | 6/2010 | Pelletier |
| 7,778,741 B2 | 8/2010 | Rao et al. |
| 7,779,947 B2 | 8/2010 | Stratton |
| 7,784,884 B2 | 8/2010 | Soucy et al. |
| 7,798,260 B2 | 9/2010 | Albright et al. |
| 7,823,987 B2 | 11/2010 | Dandurand et al. |
| 7,866,766 B2 | 1/2011 | Berg |
| 7,914,088 B2 | 3/2011 | Bair |
| 7,914,089 B2 | 3/2011 | Bair |
| D644,670 S | 9/2011 | Barrelmeyer |
| 8,016,368 B2 | 9/2011 | Sugihara |
| 8,122,581 B1 | 2/2012 | Hurst et al. |
| 8,327,960 B2 | 12/2012 | Couture et al. |
| 8,342,257 B2 | 1/2013 | Rosenboom |
| D680,561 S | 4/2013 | Zuchoski et al. |
| D681,071 S | 4/2013 | Zuchoski et al. |
| D683,371 S | 5/2013 | Aube |
| D683,769 S | 6/2013 | Aube |
| 8,567,876 B2 | 10/2013 | Wellman |
| 8,628,152 B2 | 1/2014 | Delisle et al. |
| 8,736,147 B1 | 5/2014 | Wang |
| D711,928 S | 8/2014 | Brazier |
| 8,985,250 B1 | 3/2015 | Lussier et al. |
| 9,033,431 B1 | 5/2015 | Zuchoski et al. |
| 9,067,631 B1 | 6/2015 | Lussier et al. |
| 9,162,718 B2 | 10/2015 | Lussier et al. |
| 9,334,001 B2 | 5/2016 | Lussier et al. |
| 9,592,866 B2* | 3/2017 | Hasselbusch .......... B62D 55/20 |
| 9,637,187 B2 | 5/2017 | Okada |
| 9,855,843 B2 | 1/2018 | Vik et al. |
| 9,878,750 B2 | 1/2018 | Leblanc et al. |
| 9,880,075 B2 | 1/2018 | Finch et al. |
| 9,975,554 B2 | 5/2018 | Ussier et al. |
| 10,006,836 B2 | 6/2018 | Monti et al. |
| 10,272,959 B2 | 4/2019 | Zuchoski et al. |
| 10,328,982 B2 | 6/2019 | Lussier et al. |
| 10,392,060 B2 | 8/2019 | Dandurand et al. |
| 10,745,069 B2 | 8/2020 | Gustafson |
| 10,783,723 B2 | 9/2020 | Richard et al. |
| 10,933,877 B2 | 3/2021 | Lussier et al. |
| 11,046,377 B2 | 6/2021 | Lussier et al. |
| 11,167,810 B2 | 11/2021 | Boily et al. |
| 11,186,330 B2 | 11/2021 | zuchoski et al. |
| 2002/0070607 A1 | 6/2002 | Edwards |
| 2002/0140288 A1 | 10/2002 | Herberger, Sr. et al. |
| 2002/0145335 A1 | 10/2002 | Soucy et al. |
| 2003/0019133 A1 | 1/2003 | Hori |
| 2003/0034189 A1 | 2/2003 | Lemke et al. |
| 2003/0034690 A1 | 2/2003 | Hori et al. |
| 2003/0080618 A1 | 5/2003 | Krishnan et al. |
| 2003/0089534 A1 | 5/2003 | Kanzler et al. |
| 2003/0161687 A1 | 8/2003 | Kirihata |
| 2004/0004395 A1 | 1/2004 | Soucy et al. |
| 2004/0070273 A1 | 4/2004 | Safe et al. |
| 2004/0084962 A1 | 5/2004 | Courtemanche |
| 2004/0130212 A1 | 7/2004 | Ishibashi |
| 2004/0135433 A1 | 7/2004 | Inaoka et al. |
| 2005/0035654 A1 | 2/2005 | Tamaru et al. |
| 2005/0045257 A1 | 3/2005 | Kogure et al. |
| 2005/0056468 A1 | 3/2005 | Tucker |
| 2005/0103540 A1 | 5/2005 | Lavoie |
| 2005/0104449 A1 | 5/2005 | Lavoie et al. |
| 2005/0104450 A1 | 5/2005 | Gagne et al. |
| 2005/0168069 A1 | 8/2005 | Ueno |
| 2006/0060395 A1 | 3/2006 | Boivin et al. |
| 2006/0090558 A1 | 5/2006 | Raskas |
| 2006/0103236 A1 | 5/2006 | Soucy et al. |
| 2006/0124366 A1 | 6/2006 | Le Masne De Chermont |
| 2006/0144480 A1 | 7/2006 | Takayama et al. |
| 2006/0175108 A1 | 8/2006 | Kubota |
| 2006/0220456 A1 | 10/2006 | Sugahara |
| 2006/0248484 A1 | 11/2006 | Baumgartner et al. |
| 2006/0273660 A1 | 12/2006 | Dandurand et al. |
| 2007/0029877 A1* | 2/2007 | Longley .................. B65G 7/02 305/120 |
| 2007/0046100 A1 | 3/2007 | McGilvrey et al. |
| 2007/0075456 A1 | 4/2007 | Feldmann |
| 2007/0126286 A1 | 6/2007 | Feldmann et al. |
| 2007/0159004 A1 | 7/2007 | St-Amant |
| 2007/0251621 A1 | 11/2007 | Prost |
| 2007/0252433 A1 | 11/2007 | Fujita |
| 2008/0007118 A1 | 1/2008 | Fujita |
| 2008/0073971 A1 | 3/2008 | Paradis et al. |
| 2008/0084111 A1 | 4/2008 | Rainer |
| 2008/0100134 A1 | 5/2008 | Soucy et al. |
| 2008/0136255 A1 | 6/2008 | Feldmann et al. |
| 2008/0169147 A1 | 7/2008 | Brazier |
| 2008/0179124 A1 | 7/2008 | Stratton |
| 2008/0203813 A1 | 8/2008 | Doyle |
| 2008/0211300 A1 | 9/2008 | Matsuo et al. |
| 2008/0211301 A1 | 9/2008 | Jee et al. |
| 2009/0085398 A1 | 4/2009 | Maltais |
| 2009/0102283 A1 | 4/2009 | Choi |
| 2009/0166101 A1 | 7/2009 | Wenger et al. |
| 2009/0195062 A1 | 8/2009 | Uchida |
| 2009/0224598 A1* | 9/2009 | St-Amant ............ B62D 55/244 264/258 |
| 2009/0302676 A1 | 12/2009 | Brazier |
| 2009/0302677 A1 | 12/2009 | Sugihara |
| 2009/0309415 A1 | 12/2009 | Shimozono |
| 2009/0326109 A1 | 12/2009 | Kameda et al. |
| 2010/0012399 A1 | 1/2010 | Hansen |
| 2010/0033010 A1 | 2/2010 | Shimozono |
| 2010/0079238 A1 | 4/2010 | Gravelle et al. |
| 2010/0095506 A1 | 4/2010 | Bair |
| 2010/0096915 A1 | 4/2010 | Hagio |
| 2010/0096917 A1 | 4/2010 | Bair |
| 2010/0121644 A1 | 5/2010 | Glasser |
| 2010/0133019 A1 | 6/2010 | Muemken |
| 2010/0139994 A1 | 6/2010 | Hansen |
| 2010/0191417 A1 | 7/2010 | Murahashi et al. |
| 2010/0194553 A1 | 8/2010 | Mizutani et al. |
| 2010/0230185 A1 | 9/2010 | Mallette et al. |
| 2010/0253138 A1 | 10/2010 | Despres |
| 2010/0256946 A1 | 10/2010 | Carresjo et al. |
| 2010/0283317 A1 | 11/2010 | Soucy et al. |
| 2011/0068620 A1 | 3/2011 | Delisle et al. |
| 2011/0121644 A1 | 5/2011 | Wellman |
| 2011/0148189 A1 | 6/2011 | Courtemanche et al. |
| 2011/0155482 A1* | 6/2011 | Courtemanche ....... B62D 55/14 180/9.1 |
| 2011/0301825 A1 | 12/2011 | Grajkowski et al. |
| 2011/0315459 A1 | 12/2011 | Zuchoski et al. |
| 2012/0001478 A1 | 1/2012 | Zuchoski et al. |
| 2012/0056473 A1 | 3/2012 | Hashimoto et al. |
| 2012/0104840 A1 | 5/2012 | Zuchoski et al. |
| 2012/0242142 A1 | 9/2012 | Kautsch et al. |

(56) References Cited

U.S. PATENT DOCUMENTS

| | | |
|---|---|---|
| 2012/0242143 A1 | 9/2012 | Feldmann |
| 2012/0253590 A1 | 10/2012 | Fink |
| 2012/0306916 A1 | 12/2012 | Marumoto et al. |
| 2013/0033271 A1 | 2/2013 | Woodard |
| 2013/0073157 A1 | 3/2013 | Person et al. |
| 2013/0082846 A1* | 4/2013 | Mckinley ............ G07C 3/08 340/870.01 |
| 2013/0126196 A1 | 5/2013 | Rosenboom |
| 2013/0134772 A1 | 5/2013 | Dandurand et al. |
| 2013/0134773 A1* | 5/2013 | Dandurand ....... B62D 55/065 305/165 |
| 2013/0162016 A1 | 6/2013 | Lajoie et al. |
| 2013/0245911 A1 | 9/2013 | Nakajima et al. |
| 2013/0255354 A1 | 10/2013 | Hawkins et al. |
| 2013/0325266 A1 | 12/2013 | Padilla et al. |
| 2014/0105481 A1 | 4/2014 | Hasselbusch et al. |
| 2014/0125117 A1 | 5/2014 | Weeks et al. |
| 2014/0128531 A1* | 5/2014 | Miyazaki ............ C08L 9/00 524/496 |
| 2014/0180534 A1 | 6/2014 | Son |
| 2014/0182960 A1 | 7/2014 | Bedard et al. |
| 2014/0288763 A1 | 9/2014 | Bennett et al. |
| 2014/0324301 A1 | 10/2014 | Rebinsky |
| 2015/0042152 A1 | 2/2015 | Lussier et al. |
| 2015/0042153 A1 | 2/2015 | Lussier et al. |
| 2015/0107975 A1 | 4/2015 | Chen et al. |
| 2015/0129329 A1 | 5/2015 | Cox |
| 2015/0191173 A1 | 7/2015 | Lussier et al. |
| 2015/0321710 A1 | 11/2015 | Zuchoski et al. |
| 2015/0337522 A1 | 11/2015 | Diekevers et al. |
| 2016/0052572 A1 | 2/2016 | McKinley et al. |
| 2016/0059779 A1 | 3/2016 | Vandendriessche |
| 2016/0121945 A1 | 5/2016 | Rust et al. |
| 2016/0129954 A1 | 5/2016 | Hasselbusch et al. |
| 2016/0236733 A1 | 8/2016 | Tiede et al. |
| 2016/0332682 A1 | 11/2016 | Lussier et al. |
| 2017/0036714 A1 | 2/2017 | Lunkenbein |
| 2017/0087987 A1 | 3/2017 | Vik et al. |
| 2017/0094894 A1 | 4/2017 | Heim et al. |
| 2017/0174277 A1 | 6/2017 | Zuchoski et al. |
| 2017/0177011 A1 | 6/2017 | Garvin et al. |
| 2018/0043949 A1 | 2/2018 | Boily |
| 2018/0093724 A1 | 4/2018 | Boily |
| 2018/0172557 A1 | 6/2018 | Ghidotti Piovan et al. |
| 2018/0190045 A1 | 7/2018 | Richard et al. |
| 2018/0237020 A1 | 8/2018 | Lussier et al. |
| 2018/0265145 A1 | 9/2018 | Todd et al. |
| 2018/0364744 A1 | 12/2018 | Garvin et al. |
| 2019/0351957 A1 | 11/2019 | Zuchoski et al. |
| 2019/0359270 A1 | 11/2019 | Lussier et al. |
| 2020/0070906 A1 | 3/2020 | Laperle et al. |
| 2021/0074089 A1 | 3/2021 | Boily et al. |
| 2021/0173399 A1 | 6/2021 | Richard et al. |
| 2021/0197625 A1 | 7/2021 | Laperle et al. |
| 2021/0213954 A1 | 7/2021 | Lussier et al. |
| 2021/0339758 A1 | 11/2021 | Laperle et al. |
| 2022/0055699 A1 | 2/2022 | Desmarais et al. |
| 2022/0063740 A1 | 3/2022 | Boily et al. |

FOREIGN PATENT DOCUMENTS

| | | | |
|---|---|---|---|
| CA | 2978482 A1 | 9/2016 | |
| CA | 3064100 A1 | 9/2016 | |
| CA | 2991072 | 1/2017 | |
| CA | 2947575 A1 | 5/2017 | |
| CA | 3110606 | 3/2020 | |
| CN | 202753706 U | 2/2013 | |
| CN | 110588813 | 12/2019 | |
| DE | 20207342 U1 | 8/2002 | |
| DE | 202012005265 U1 * | 8/2012 | ............ B29C 48/00 |
| EP | 0578504 A2 | 1/1994 | |
| EP | 1008509 A1 | 6/2000 | |
| EP | 1211169 A2 | 6/2002 | |
| EP | 1260429 A2 | 11/2002 | |
| EP | 1273504 A1 | 1/2003 | |
| EP | 1283152 A1 | 2/2003 | |
| EP | 1325820 B1 | 9/2004 | |
| EP | 1506913 A1 | 2/2005 | |
| EP | 1882627 A1 | 1/2008 | |
| EP | 1953070 A1 | 8/2008 | |
| EP | 2014542 A1 | 1/2009 | |
| EP | 2119620 A1 | 11/2009 | |
| EP | 3185097 | 6/2017 | |
| EP | 3265368 A1 | 1/2018 | |
| EP | 3313717 A1 | 5/2018 | |
| EP | 3721200 | 10/2020 | |
| EP | 3721200 A1 | 10/2020 | |
| EP | 3747746 A1 | 12/2020 | |
| EP | 3812249 | 4/2021 | |
| EP | 3844473 | 7/2021 | |
| EP | 3844474 | 7/2021 | |
| EP | 3960593 | 2/2022 | |
| FR | 2107614 A5 | 5/1972 | |
| GB | 2229410 A | 9/1990 | |
| GB | 2360501 | 9/2001 | |
| JP | 64028080 A | 1/1989 | |
| JP | H02074476 | 3/1990 | |
| JP | H11129946 A | 5/1999 | |
| JP | 2000053037 A | 2/2000 | |
| JP | 2000053038 | 2/2000 | |
| JP | 2003011860 A | 1/2003 | |
| JP | 2003089366 A | 3/2003 | |
| JP | 2004330830 A | 11/2004 | |
| JP | 3734876 | 1/2006 | |
| JP | 2006103482 A | 4/2006 | |
| JP | 2007022304 A | 2/2007 | |
| JP | 2009061829 A | 3/2009 | |
| JP | 4282366 | 6/2009 | |
| JP | 2009248924 A | 10/2009 | |
| JP | 2009274596 | 11/2009 | |
| JP | 2010018091 A | 1/2010 | |
| JP | 2010047040 A | 3/2010 | |
| JP | 2010089729 A | 4/2010 | |
| JP | 2011011622 A | 1/2011 | |
| JP | 4713964 | 6/2011 | |
| JP | 5279438 | 9/2013 | |
| JP | 5841711 | 1/2016 | |
| KR | 100829059 | 5/2008 | |
| KR | 20120055071 A | 5/2012 | |
| NO | 2014168851 A1 | 10/2014 | |
| SU | 1446017 A2 | 12/1988 | |
| WO | 2008088355 A1 | 7/2008 | |
| WO | 2008108439 A1 | 9/2008 | |
| WO | 2009105892 A1 | 9/2009 | |
| WO | 2009106617 A1 | 9/2009 | |
| WO | 2013002781 A1 | 1/2013 | |
| WO | 2014056089 A1 | 4/2014 | |
| WO | 2014138931 | 9/2014 | |
| WO | 2016138592 A1 | 9/2016 | |
| WO | 2017000068 A1 | 1/2017 | |
| WO | 2017049393 | 3/2017 | |
| WO | 2019109191 A1 | 6/2019 | |
| WO | 2019225752 | 11/2019 | |
| WO | 2020041897 A1 | 3/2020 | |
| WO | 2020041899 A1 | 3/2020 | |
| WO | 2020049532 | 3/2020 | |
| WO | 2021189154 | 9/2021 | |

OTHER PUBLICATIONS

Examiner's report dated Jan. 22, 2021, in connection with Canadian Patent Application No. 2,991,072, 3 pages.

Non-Final Office Action dated Dec. 14, 2020, in connection with U.S. Appl. No. 15/555,148, 9 pages.

Notice of Allowance dated Feb. 23, 2021 in connection with U.S. Appl. No. 15/724,733, 18 pages.

Final Office Action U.S. Appl. No. Mar. 9, 2021, in connection with U.S. Appl. No. 15/555,148, 14 pages.

Notice of Allowance dated Mar. 4, 2015 in connection with U.S. Appl. No. 13/325,783, 13 pages.

Notice of Allowance dated May 20, 2020 in connection with U.S. Appl. No. 15/740,976, 12 pages.

(56) References Cited

OTHER PUBLICATIONS

Notice of Allowance dated May 30, 2018 in connection with U.S. Appl. No. 15/139,572, 10 pages.
Notice of Allowance dated Nov. 14, 2014 in connection with U.S. Appl. No. 13/326,010, 7 pages.
Notice of Allowance dated Oct. 30, 2020, in connection with U.S. Appl. No. 15/958,156, 30 pages.
Notice of Allowance dated Oct. 24, 2014 in connection with U.S. Appl. No. 13/170,753, 5 pages.
Non-Final Office Action dated Feb. 2, 2021, in connection with U.S. Appl. No. 16/360,060, 55 pages.
Non-Final Office Action dated Jan. 24, 2020 in connection with U.S. Appl. No. 15/555,148, 57 pages.
Non-Final Office Action dated May 29, 2020, in connection with U.S. Appl. No. 15/958,156, 45 bages.
Non-Final Office Action dated Nov. 9, 2012, in connection with U.S. Appl. No. 29/405,414, 9 pages.
Ex parte Quayle dated Sep. 11, 2018 in connection with U.S. Appl. No. 15/139,572, 7 pages.
Restriction Requirement dated Jan. 27, 2014 in connection with U.S. Appl. No. 13/326,010, 5 pages.
Restriction Requirement dated Jun. 9, 2014 in connection with U.S. Appl. No. 13/326,278, 7 pages.
Restriction Requirement dated Sep. 26, 2013 in connection with U.S. Appl. No. 13/326,010, 6 pages.
Supplementary Search Report dated Jan. 2, 2019 in connection with the European Patent Application No. 16816886, 1 page.
Written Opinion dated Mar. 5, 2019 in connection with International PCT application No. PCT/CA2018/051567, 6 pages.
International Search Report and Written Opinion dated Jun. 21, 2021 in connection with International PCT application No. PCT/CA2021/050404, 8 pages.
Notice of Allowance dated Jul. 9, 2021, in connection with U.S. Appl. No. 15/555,148, 6 pages.
Notice of Allowance dated Jul. 26, 2021, in connection with U.S. Appl. No. 16/360,060, 14 pages.
Extended European Search Report dated Mar. 30, 2021, in connection with European Patent Application No. 20201638.2, 10 pages.
Non-Final Office Action dated Mar. 11, 2021 in connection with U.S. Appl. No. 16/419,760, 28 pages.
Final Office Action dated Nov. 9, 2021 in connection with U.S. Appl. No. 16/419,760, 57 pages.
International Search Report and Written Opinion dated Nov. 3, 2021 in connection with International PCT application No. PCT/CA2021/051143, 17 pages.
Non-Final Office Action dated Feb. 2, 2022, in connection with U.S. Appl. No. 16/770,746, 26 pages.
Extended European Search Report dated Feb. 1, 2022, in connection with European Patent Application No. 21191893.3, 11 pages.
Bair Products, Inc. "Larry Lugs—Patented Bolt-On-Replacement Drive Lugs", http://www.bairproductsinc.com/products/larry_lugs.html, Jan. 1, 2011, 2 pages.
Bridgestone Industrial Products America Inc. "Stay on the Right Track. New Generation Features Rubber Tracks for Excavators", Brochure 2009, 12 pages.
Bridgestone Industrial Products America Inc., "Stay on the Right Track. Rubber Tracks for Track Loaders", Brochure 2009, 6 pages.
Camoplast Inc. "ATV/UTV Track Systems", 2009-2010 Catalog, 8 pages.
CAN-AM BRP, "Parts & Accessories—Track Systems", Parts, Accessories & Riding Gear Catalogue, p. 66 (2011).
Red Roo Solutions PTY Ltd—World Class Solutions for the Earth Moving Industry, "Save thousands of dollars and add thousands of hours to your tracks with Larry Lugs", http://www.redroosolutions.com.au/larrylugs.html, Jun. 8, 2009, 3 pages.
Story by Staff, BRP upgrades Apache ATV track system for Outlander—Apache system features larger footprint and power steering mode, atv.com, http://www.atc.com/news/brp-upgrades-apache-atv-track-system-for-outlander-1481. html 2 pages (Nov. 24, 2009).

Non-Final Office Action dated Nov. 9, 2012, in connection with U.S. Appl. No. 29/405,416, 9 pages.
Non-Final Office Action dated Nov. 9, 2012, in connection with U.S. Appl. No. 29/405,417, 10 pages.
Communication pursuant to Article 94 (3) EPC dated Aug. 22, 2019, in connection with European Patent Application No. 16816886.2, 4 pages.
Communication pursuant to Rule 63(1) EPC dated Nov. 8, 2018 in connection with European Patent Application No. 16758408.5, 4 pages.
Communication under Rule 71(3) EPC dated Mar. 16, 2020, in connection with European Patent Application 16758408.5, 7 pages.
Communication under Rule 71(3) EPC dated May 6, 2020, in connection with European Patent Application No. 16816886.2, 7 pages.
European Extended Search Report dated Nov. 6, 2020, in connection with European Patent Application No. 20187079.7, 15 pages.
Ex Parte Quayle issued on Sep. 11, 2018, in connection with U.S. Appl. No. 15/139,572, 7 pages.
Examiners Report dated Apr. 7, 2020, in connection with Canadian Patent Application 3,064,100, 3 pages.
Examiners report dated Aug. 28, 2018, in connection with Canadian Patent application No. 2,991,072, 4 pages.
Examiners Report dated Feb. 1, 2018 in connection with Canadian Patent Application No. 2,991,072, 3 pages.
Examiners Report dated Jan. 11, 2018 in connection with Canadian Patent Application No. 2,978,482, 3 pages.
Examiners report dated Jan. 16, 2019 in connection with Canadian Patent Application No. 2,991,072, 3 pages.
Examiners Report dated Jul. 9, 2020, in connection with Canadian Patent Application 3,064, 100, 3 pages.
Examiners Report dated Oct. 14, 2020, in connection with Canadian Patent Application 3,042,780, 4 pages.
Extended European Search Report and Written Opinion dated Sep. 13, 2013 in connection, with European Patent Application No. 10835318.6, 8 pages.
Extended European Search Report dated Jan. 9, 2019 in connection with European Patent Application No. 16816886.2, 7 pages.
Extended European Search Report dated Mar. 20, 2019 in connection with European Patent Application No. 16758408.5, 8 pages.
Final Office Action dated Aug. 19, 2019, in connection with U.S. Appl. No. 15/724,733, 18 pages.
Final Office Action dated Aug. 24, 2018 in connection with U.S. Appl. No. 15/454,881, 30 pages.
Final Office Action dated Dec. 23, 2014 in connection with U.S. Appl. No. 13/326,132, 15 pages.
Final Office Action dated Dec. 31, 2015 in connection with U.S. Appl. No. 13/326,132, 15 pages.
Final Office Action dated Jan. 12, 2017 in connection with U.S. Appl. No. 14/665,075, 11 pages.
Final Office Action dated Jul. 6, 2020, in connection with U.S. Appl. No. 15/555,148, 20 pages.
Final Office Action dated Jun. 26, 2015 in connection with U.S. Appl. No. 13/326,278, 15 pages.
Final Office Action dated Mar. 27, 2014 in connection with U.S. Appl. No. 13/170,753, 16 pages.
Final Office Action dated Mar. 5, 2015 in connection with U.S. Appl. No. 13/325,796, 33 pages.
Final Office Action dated Sep. 8, 2017 in connection with U.S. Appl. No. 15/139,572, 14 pages.
International Search Report and Written Opinion dated Sep. 29, 2016 in connection with PCT/CA2016/050760, 8 pages.
International Search Report and Written Opinion dated Nov. 12, 2019, in connection with International PCT Application No. PCT/CA2019/051217, 8 pages.
International Search Report and Written Opinion dated Oct. 29, 2019 in connection with International PCT Application No. PCT/CA2019/051219, 9 pages.
International Search Report dated Mar. 5, 2019, in connection with International PCT application No. PCT/CA2018/051567, 4 pages.
Interview Summary dated Dec. 10, 2018 in connection with U.S. Appl. No. 15/139,572, 3 pages.

(56) References Cited

OTHER PUBLICATIONS

Interview Summary dated Nov. 2, 2018 in connection with U.S. Appl. No. 15/454,881, 3 pages.
Interview Summary Report dated Sep. 12, 2015 in connection with U.S. Appl. No. 13/326,278, 3 pages.
Non-Final Office Action dated Apr. 5, 2016 in connection with U.S. Appl. No. 14/665,075, 5 pages.
Non-Final Office Action dated Apr. 9, 2019 in connection with U.S. Appl. No. 15/724,733, 56 pages.
Non-Final Office Action dated Dec. 1, 2016 in connection with U.S. Appl. No. 15/139,572, 5 pages.
Non-Final Office Action dated Dec. 30, 2019 in connection with U.S. Appl. No. 15/740,976, 16 pages.
Non-Final Office Action dated Feb. 21, 2017 in connection with U.S. Appl. No. 14/721,326, 12 pages.
Non-Final Office Action dated Jan. 11, 2017 in connection with U.S. Appl. No. 14/886,327, 11 pages.
Non-Final Office Action dated Jul. 10, 2014 in connection with U.S. Appl. No. 13/326,110, 16 pages.
Non-Final Office Action dated Jul. 10, 2014 in connection with U.S. Appl. No. 13/424,459, 11 pages.
Non-Final Office Action dated Jul. 14, 2014 in connection with U.S. Appl. No. 13/112,840, 16 pages.
Non-Final Office Action dated Jun. 12, 2017 in connection with U.S. Appl. No. 14/665,075, 9 pages.
Non-Final Office Action dated Jun. 2, 2014 in connection with U.S. Appl. No. 13/326,010, 6 pages.
Non-Final Office Action dated Jun. 24, 2015 in connection with U.S. Appl. No. 13/326,132, 17 pages.
Non-Final Office Action dated Mar. 20, 2018 in connection with U.S. Appl. No. 15/139,572, 7 pages.
Non-Final Office Action dated Mar. 6, 2015 in connection with U.S. Appl. No. 13/326,278, 16 pages.
Non-Final Office Action dated May 17, 2018 in connection with U.S. Appl. No. 15/454,881, 8 pages.
Non-Final Office Action dated Oct. 11, 2017 in connection with U.S. Appl. No. 14/665,075, 6 pages.
Non-Final Office Action dated Oct. 2, 2013 in connection with U.S. Appl. No. 13/170,753, 15 pages.
Restriction Requirement dated Oct. 25, 2019 in connection with U.S. Appl. No. 15/555,148, 7 pages.
European Extended Search Report dated Mar. 20, 2019 in connection with European Patent Application No. 16758408.5, 8 pages.
International Search Report dated Jun. 29, 2016 in connection with International Patent Application No. PCT/CA2016/050234, 3 pages.
Written Opinion dated Jun. 29, 2016 in connection with International Patent Application No. PCT/CA2016/050234, 3 pages.
Non-final Office Action dated Oct. 5, 2020, in connection with U.S. Appl. No. 15/724,733, 7 pages.
Non-Final Office Action dated Sep. 22, 2014 in connection with U.S. Appl. No. 13/325,796, 25 pages.
Non-Final Office Action dated Sep. 29, 2014 in connection with U.S. Appl. No. 13/325,783, 27 pages.
Notice of Allowance dated Apr. 2, 2020, in connection with U.S. Appl. No. 15/724,733, 5 pages.
Notice of Allowance dated Dec. 17, 2018 in connection with U.S. Appl. No. 15/454,881, 5 pages.
Notice of Allowance dated Feb. 15, 2019 in connection with U.S. Appl. No. 15/139,572, 7 pages.
Notice of Allowance dated Jan. 11, 2016 in connection with U.S. Appl. No. 13/326,278, 7 pages.
Notice of Allowance dated Jan. 19, 2018 in connection with U.S. Appl. No. 14/665,075, 8 pages.
Notice of Allowance dated Jan. 21, 2015 in connection with U.S. Appl. No. 13/326,110, 6 pages.
Transmittal of decision/summons—opposition for related European Patent No. 3265368, dated Feb. 14, 2023.
Communication about intention to grant a European patent for related European Patent application No. 3747746, dated Feb. 8, 2023.
Transmission of U.S. Appl. No. 62/128,183 Application.

* cited by examiner

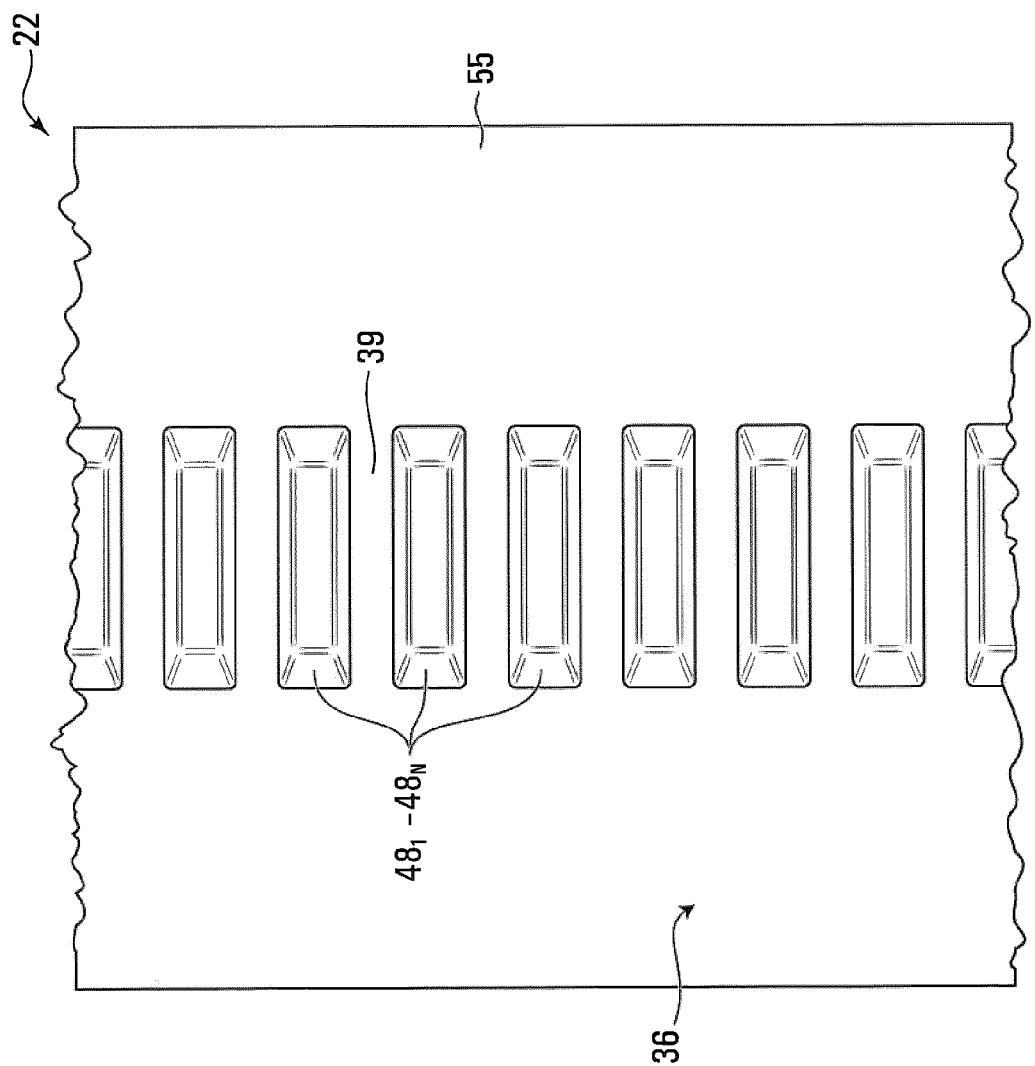

TRACK SYSTEM FOR TRACTION OF A VEHICLE

CROSS-REFERENCE TO RELATED APPLICATIONS

This application is a continuation of U.S. patent application Ser. No. 15/724,733 filed on Oct. 4, 2017, which is a continuation of U.S. patent application Ser. No. 15/555,148 filed on Sep. 1, 2017, which is a National Phase Entry Application of international PCT Application PCT/CA2016/050234 filed on Mar. 4, 2016 and which claims priority from U.S. Patent Application 62/128,183 filed on Mar. 4, 2015, which are hereby incorporated by reference herein in their entirety.

FIELD OF THE INVENTION

The invention relates to track systems for traction of off-road vehicles such as, for example, agricultural vehicles, industrial vehicles, and military vehicles.

BACKGROUND

Certain off-road vehicles, such as agricultural vehicles (e.g., harvesters, combines, tractors, etc.), industrial vehicles such as construction vehicles (e.g., loaders, bulldozers, excavators, etc.) and forestry vehicles (e.g., feller-bunchers, tree chippers, knuckleboom loaders, etc.), and military vehicles (e.g., combat engineering vehicles (CEVs), etc.) to name a few, may be equipped with elastomeric tracks which enhance their traction and floatation on soft, slippery and/or irregular grounds (e.g., soil, mud, sand, ice, snow, etc.) on which they operate.

An elastomeric track comprises a ground-engaging outer side including a plurality of traction projections, sometimes referred to as "traction lugs", "tread bars" or "tread blocks", which are distributed in its longitudinal direction to enhance traction on the ground. Deterioration of the traction projections during use may sometimes become significant enough to force replacement of the track even though the track's carcass is still in acceptable condition. For example, the traction projections may sometimes "blowout", i.e., explode, under repeated loads as heat buildup within them increases their internal temperature such that part of their internal elastomeric material decomposes and generates a volatile product which increases internal pressure until they burst. As another example, the traction projections may wear rapidly in some cases (e.g., due to abrasive or harsh ground conditions). Such deterioration of the traction projections may become more prominent, particularly where there is more roading of the track on hard road surfaces (e.g., in an agricultural vehicle travelling on paved roads between fields or other agricultural sites).

This type of track also comprises an inner side which may include a plurality of drive/guide projections, commonly referred to as "drive/guide lugs", which are spaced apart along its longitudinal direction and used for driving and/or guiding the track around wheels of a vehicle to which the track provides traction. Wear or other deterioration of the drive/guide lugs (e.g., as they come into contact with one or more of the wheels) often also reduces the track's useful life.

For these and other reasons, there is a need to improve elastomeric tracks for traction of vehicles and components of such tracks.

SUMMARY OF THE INVENTION

According to an aspect of the invention, there is provided a track for traction of a vehicle. The track is mountable around a plurality of wheels that comprises a drive wheel for driving the track. The track is elastomeric to flex around the wheels. The track comprises: an inner surface for facing the wheels; a ground-engaging outer surface for engaging the ground; and a plurality of traction projections projecting from the ground-engaging outer surface and distributed in a longitudinal direction of the track. Each traction projection of the plurality of traction projections comprises a first material and a second material disposed inwardly of the first material. A blowout resistance of the second material is greater than a blowout resistance of the first material.

According to another aspect of the invention, there is provided a track for traction of a vehicle. The track is mountable around a plurality of wheels that comprises a drive wheel for driving the track. The track is elastomeric to flex around the wheels. The track comprises: an inner surface for facing the wheels; a ground-engaging outer surface for engaging the ground; and a plurality of traction projections projecting from the ground-engaging outer surface and distributed in a longitudinal direction of the track. Each traction projection of the plurality of traction projections has a blowout time of at least 15 minutes under ASTM D-623 (method A) conditions.

According to another aspect of the invention, there is provided a method of making a track for traction of a vehicle. The track is mountable around a plurality of wheels that comprises a drive wheel for driving the track. The track is elastomeric to flex around the wheels. The method comprises forming a body of the track. The body comprises an inner surface for facing the wheels and a ground-engaging outer surface for engaging the ground. The method comprises forming a plurality of traction projections projecting from the ground-engaging outer surface and distributed in a longitudinal direction of the track. Each traction projection of the plurality of traction projections comprises a first material and a second material disposed inwardly of the first material. A blowout resistance of the second material is greater than a blowout resistance of the first material.

According to another aspect of the invention, there is provided a method of making a track for traction of a vehicle. The track is mountable around a plurality of wheels that comprises a drive wheel for driving the track. The track is elastomeric to flex around the wheels. The method comprises forming a body of the track. The body comprises an inner surface for facing the wheels and a ground-engaging outer surface for engaging the ground. The method comprises forming a plurality of traction projections projecting from the ground-engaging outer surface and distributed in a longitudinal direction of the track. Each traction projection of the plurality of traction projections has a blowout time of at least 15 minutes under ASTM D-623 (Method A) conditions.

According to another aspect of the invention, there is provided a system for protecting a track providing traction to a vehicle. The track is mounted around a plurality of wheels that comprises a drive wheel for driving the track. The track is elastomeric to flex around the wheels. The track comprises: an inner surface for facing the wheels; a ground-engaging outer surface for engaging the ground; and a plurality of traction projections projecting from the ground-engaging outer surface and distributed in a longitudinal direction of the track. The system comprises: a sensor for monitoring the track; and a processing apparatus connected to the sensor and configured to issue a signal regarding a potential occurrence of blowout of at least one of the traction projections.

These and other aspects of the invention will now become apparent to those of ordinary skill in the art upon review of the following description of embodiments of the invention in conjunction with the accompanying drawings.

BRIEF DESCRIPTION OF THE DRAWINGS

A detailed description of embodiments of the invention is provided below, by way of example only, with reference to the accompanying drawings, in which:

FIG. 4 shows an inside view of the track;

It is to be expressly understood that the description and drawings are only for the purpose of illustrating certain embodiments of the invention and are an aid for understanding. They are not intended to be a definition of the limits of the invention.

DETAILED DESCRIPTION OF EMBODIMENTS

Figure 1:
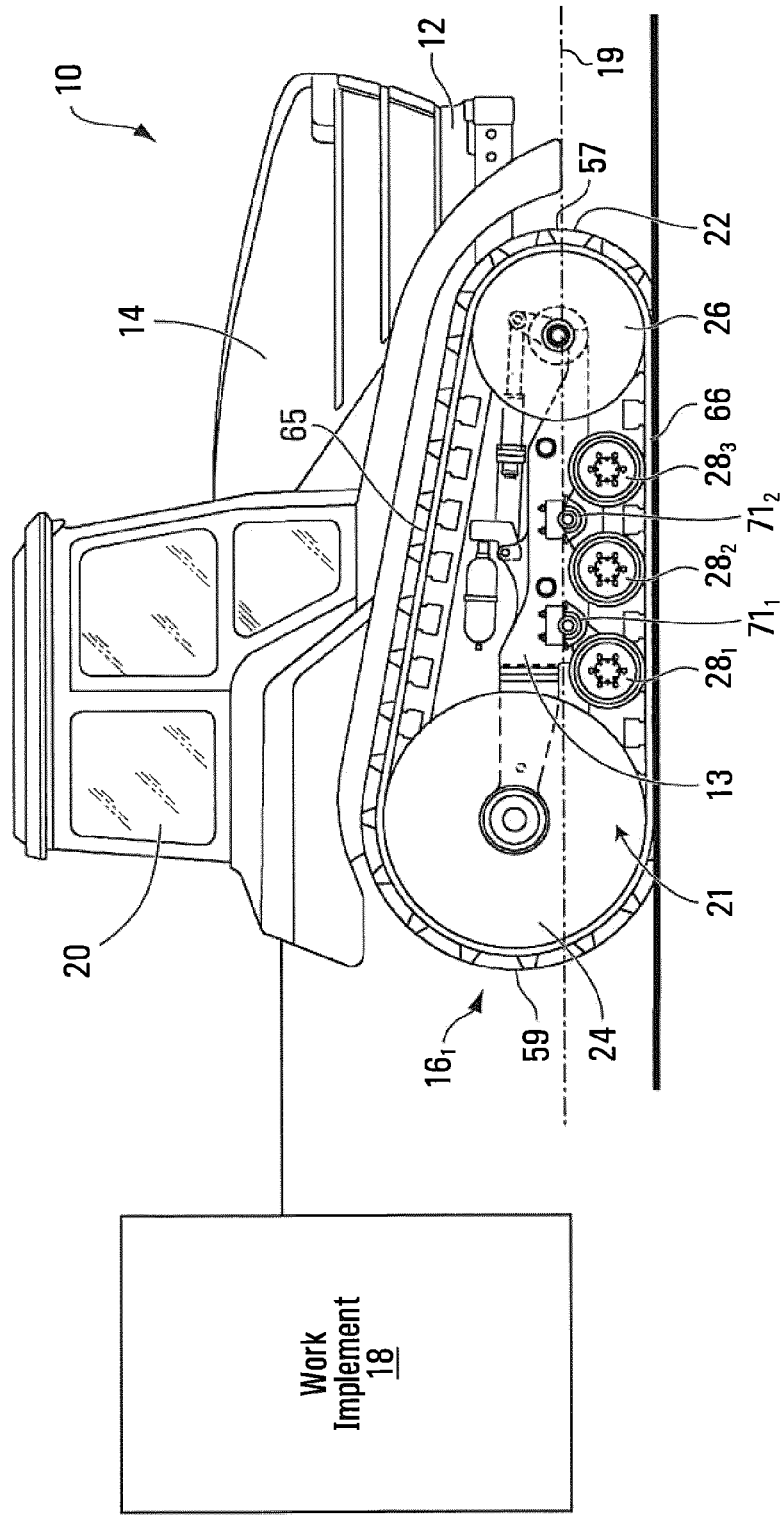
FIG. 1 shows an example of a tracked vehicle comprising a track system in accordance with an embodiment of the invention.
Figure 3:
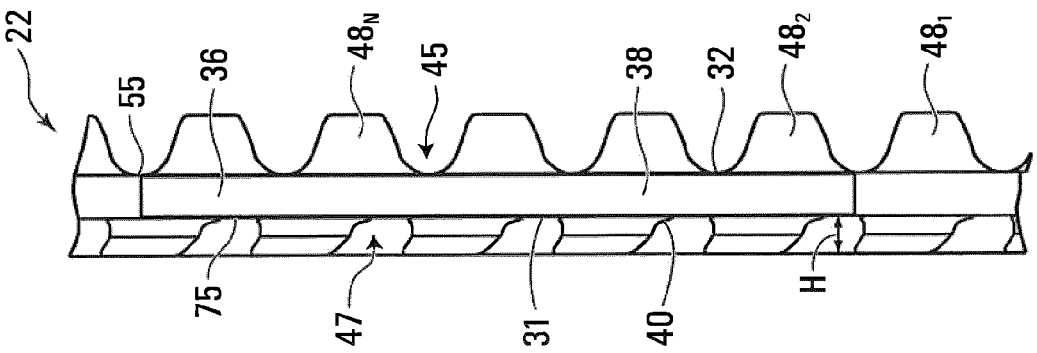
FIGS. 2 and 3 show a plan view and a side view of a track of the track system.
Figure 2:
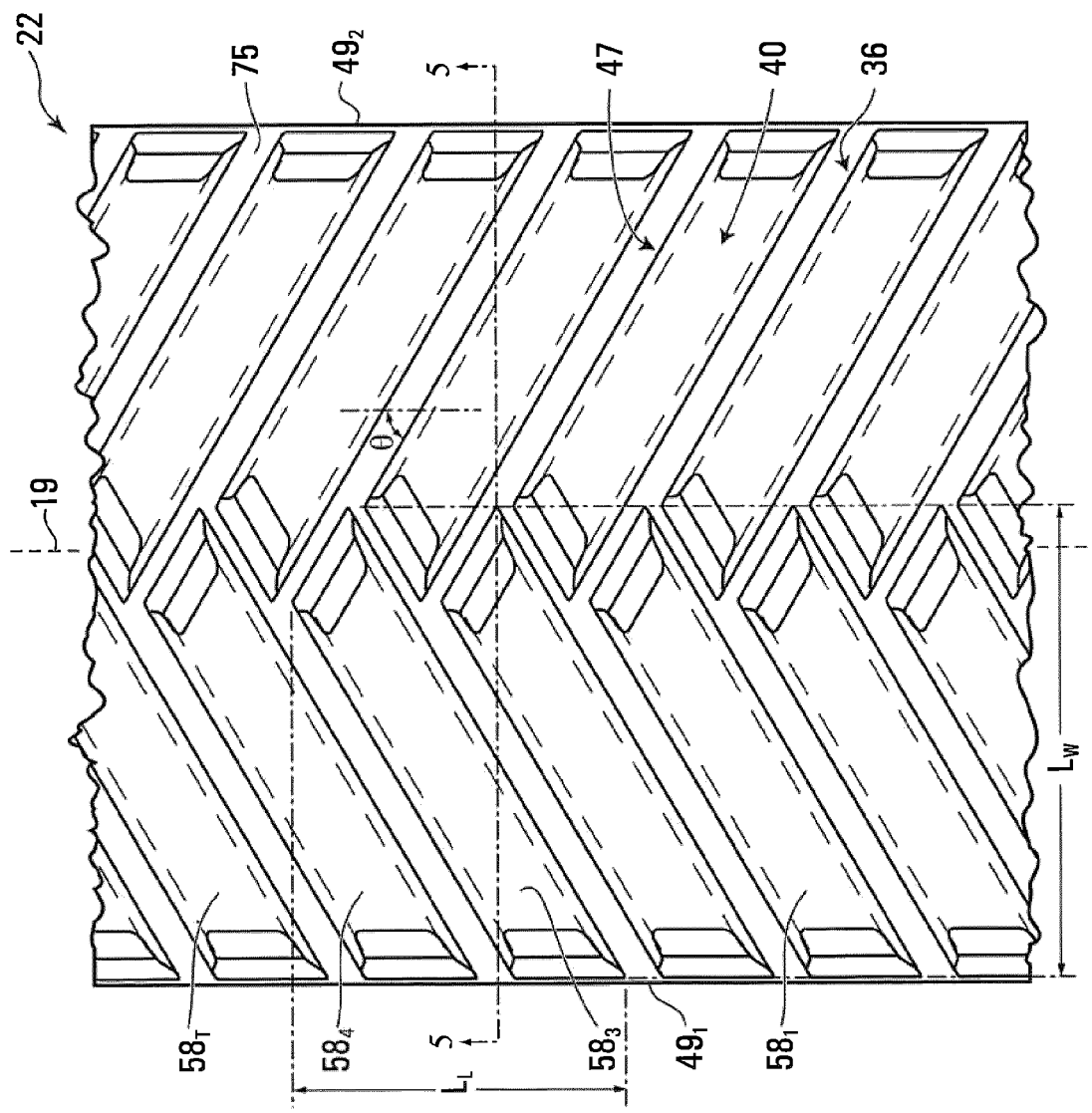
Figure 5:
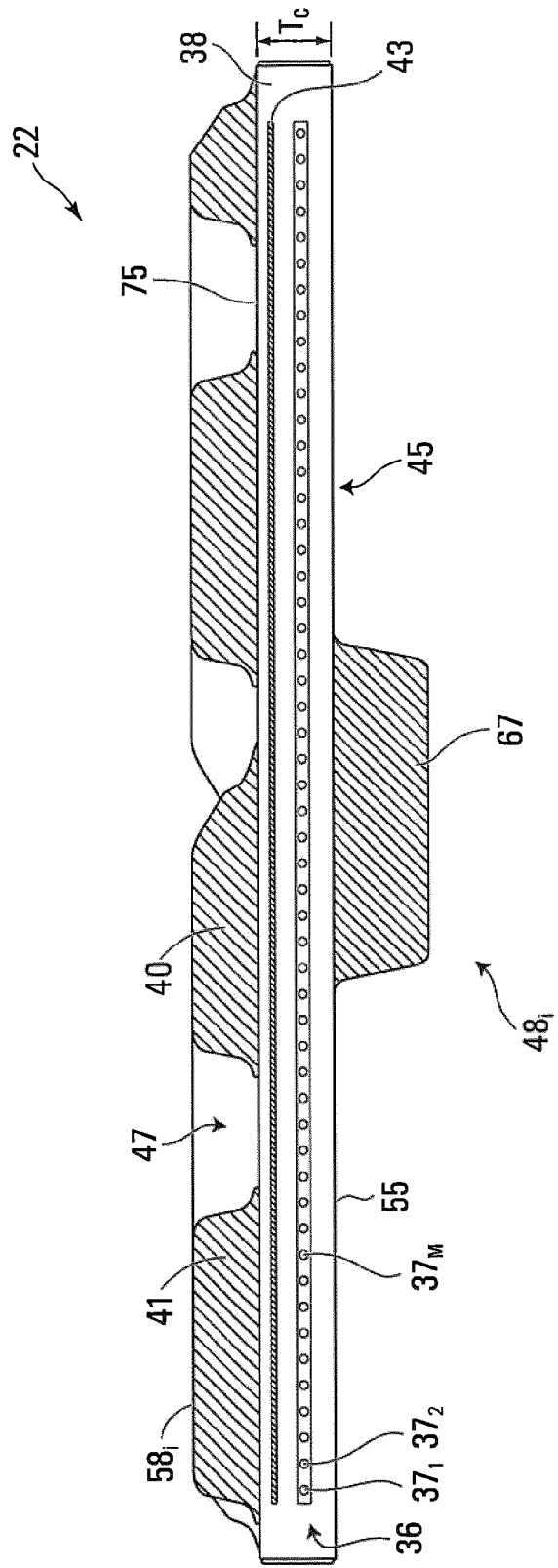
FIG. 5 shows a cross-sectional view of the track.

FIG. 1 shows an example of an off-road tracked vehicle 10 in accordance with an embodiment of the invention. In this embodiment, the vehicle 10 is a heavy-duty work vehicle for performing agricultural work, construction or other industrial work, or military work. More particularly, in this embodiment, the vehicle 10 is an agricultural vehicle for performing agricultural work. Specifically, in this example, the agricultural vehicle 10 is a tractor. In other examples, the agricultural vehicle 10 may be a combine harvester, another type of harvester, or any other type of agricultural vehicle.

The agricultural vehicle 10 comprises a frame 12 supporting a prime mover 14, a pair of track systems $16_1$, $16_2$ (which can be referred to as "undercarriages"), and an operator cabin 20, which enable an operator to move the agricultural vehicle 10 on the ground to perform agricultural work possibly using a work implement 18.

The prime mover 14 provides motive power to move the agricultural vehicle 10. For example, the prime mover 14 may comprise an internal combustion engine and/or one or more other types of motors (e.g., electric motors, etc.) for generating motive power to move the agricultural vehicle 10. The prime mover 14 is in a driving relationship with each of the track systems $16_1$, $16_2$. That is, power derived from the prime mover 14 is transmitted to the track systems $16_1$, $16_2$ via a powertrain of the agricultural vehicle 10.

The work implement 18 is used to perform agricultural work. For example, in some embodiments, the work implement 18 may be a combine head, a cutter, a scraper, a tiller, or any other type of agricultural work implement.

The operator cabin 20 is where the operator sits and controls the agricultural vehicle 10. More particularly, the operator cabin 20 comprises a user interface including a set of controls that allow the operator to steer the agricultural vehicle 10 on the ground and operate the work implement 18.

The track systems $16_1$, $16_2$ engage the ground to propel the agricultural vehicle 10. Each track system $16_i$ comprises a track-engaging assembly 21 and a track 22 disposed around the track-engaging assembly 21. In this embodiment, the track-engaging assembly 21 comprises a plurality of wheels which, in this example, includes a drive wheel 24 and a plurality of idler wheels that includes a front idler wheel 26 and a plurality of roller wheels $28_1$-$28_6$. The track system $16_i$ also comprises a frame 13 which supports various components of the track system $16_i$, including the roller wheels $28_1$-$28_6$. The track system $16_i$ has a longitudinal direction and a first longitudinal end 57 and a second longitudinal end 59 that define a length of the track system $16_i$. The track system $16_i$ has a widthwise direction and a width that is defined by a width of the track 22. The track system $16_i$ also has a height direction that is normal to its longitudinal direction and its widthwise direction.

The track 22 engages the ground to provide traction to the agricultural vehicle 10. In this embodiment, certain parts of the track 22 are designed to enhance their resistance to deterioration during use, including their resistance to blowout, as further discussed later.

A length of the track 22 allows the track 22 to be mounted around the track-engaging assembly 21. In view of its closed configuration without ends that allows it to be disposed and moved around the track-engaging assembly 21, the track 22 can be referred to as an "endless" track. With additional reference to FIGS. 2 to 5, the track 22 comprises an inner side 45, a ground-engaging outer side 47, and lateral edges $49_1$, $49_2$. The inner side 45 faces the wheels 24, 26, $28_1$-$28_6$, while the ground-engaging outer side 47 engages the ground. A top run 65 of the track 22 extends between the longitudinal ends 57, 59 of the track system $16_i$ and over the wheels 24, 26, $28_1$-$28_6$, while a bottom run 66 of the track 22 extends between the longitudinal ends 57, 59 of the track system $16_i$ and under the wheels 24, 26, $28_1$-$28_6$. The track 22 has a longitudinal axis 19 which defines a longitudinal direction of the track 22 (i.e., a direction generally parallel to its longitudinal axis) and transversal directions of the track 22 (i.e., directions transverse to its longitudinal axis), including a widthwise direction of the track 22 (i.e., a lateral direction generally perpendicular to its longitudinal axis). The track 22 has a thickness direction normal to its longitudinal and widthwise directions.

The track 22 is elastomeric, i.e., comprises elastomeric material, to be flexible around the track-engaging assembly 21. The elastomeric material of the track 22 can include any polymeric material with suitable elasticity. In this embodiment, the elastomeric material of the track 22 includes rubber. Various rubber compounds may be used and, in some cases, different rubber compounds may be present in different areas of the track 22. In other embodiments, the elastomeric material of the track 22 may include another elastomer in addition to or instead of rubber (e.g., polyurethane elastomer).

More particularly, the track 22 comprises an endless body 36 underlying its inner side 45 and ground-engaging outer side 47. In view of its underlying nature, the body 36 will be referred to as a "carcass". The carcass 36 is elastomeric in that it comprises elastomeric material 38 which allows the carcass 36 to elastically change in shape and thus the track 22 to flex as it is in motion around the track-engaging assembly 21. The carcass 36 comprises an inner surface 32 and a ground-engaging outer surface 31 that are opposite one another.

In this embodiment, the carcass 36 comprises a plurality of reinforcements embedded in its elastomeric material 38. These reinforcements can take on various forms.

For example, in this embodiment, the carcass 36 comprises a layer of reinforcing cables $37_1$-$37_M$ that are adjacent to one another and extend generally in the longitudinal direction of the track 22 to enhance strength in tension of the track 22 along its longitudinal direction. In this case, each of the reinforcing cables $37_1$-$37_M$ is a cord including a plurality of strands (e.g., textile fibers or metallic wires). In other cases, each of the reinforcing cables $37_1$-$37_M$ may be another type of cable and may be made of any material suitably flexible along the cable's longitudinal axis (e.g., fibers or wires of metal, plastic or composite material).

As another example, in this embodiment, the carcass 36 comprises a layer of reinforcing fabric 43. The reinforcing fabric 43 comprises thin pliable material made usually by weaving, felting, knitting, interlacing, or otherwise crossing natural or synthetic elongated fabric elements, such as fibers, filaments, strands and/or others, such that some elongated fabric elements extend transversally to the longitudinal direction of the track 22 to have a reinforcing effect in a transversal direction of the track 22. For instance, the reinforcing fabric 43 may comprise a ply of reinforcing woven fibers (e.g., nylon fibers or other synthetic fibers).

The carcass 36 has a thickness $T_c$, measured from its inner surface 32 to its ground-engaging outer surface 31, which is relatively large in this embodiment. For example, in some embodiments, the thickness $T_c$ of the carcass 36 may be at least than 20 mm, in some cases at least 25 mm, in some cases at least 30 mm, in some cases at least 35 mm, and in some cases even more (e.g., 40 mm or more). The thickness $T_c$ of the carcass 36 may have any other suitable value in other embodiments.

The carcass 36 may be molded into shape in a molding process during which the rubber 38 is cured. For example, in this embodiment, a mold may be used to consolidate layers of rubber providing the rubber 38 of the carcass 36, the reinforcing cables $37_1$-$37_M$ and the layer of reinforcing fabric 43.

In this embodiment, the endless track 22 is a one-piece "jointless" track such that the carcass 36 is a one-piece jointless carcass. In other embodiments, the endless track 22 may be a "jointed" track (i.e., having at least one joint connecting adjacent parts of the track 22) such that the carcass 36 is a jointed carcass (i.e., which has adjacent parts connected by the at least one joint). For example, in some embodiments, the track 22 may comprise a plurality of track sections interconnected to one another at a plurality of joints, in which case each of these track sections includes a respective part of the carcass 36. In other embodiments, the endless track 22 may be a one-piece track that can be closed like a belt with connectors at both of its longitudinal ends to form a joint.

The inner side 45 of the endless track 22 comprises an inner surface 55 of the carcass 36 and a plurality of inner wheel-contacting projections $48_1$-$48_N$ that project from the inner surface 55 and are positioned to contact at least some of the wheels 24, 26, $28_1$-$28_6$ to do at least one of driving (i.e., imparting motion to) the track 22 and guiding the track 22. The wheel-contacting projections $48_1$-$48_N$ can be referred to as "wheel-contacting lugs". Furthermore, since each of them is used to do at least one of driving the track 22 and guiding the track 22, the wheel-contacting lugs $48_1$-$48_N$ can be referred to as "drive/guide projections" or "drive/guide lugs". In some examples of implementation, a drive/guide lug $48_i$ may interact with the drive wheel 24 to drive the track 22, in which case the drive/guide lug $48_i$ is a drive lug. In other examples of implementation, a drive/guide lug $48_i$ may interact with the idler wheel 26 and/or the roller wheels $28_1$-$28_6$ to guide the track 22 to maintain proper track alignment and prevent de-tracking without being used to drive the track 22, in which case the drive/guide lug $48_i$ is a guide lug. In yet other examples of implementation, a drive/guide lug $48_i$ may both (i) interact with the drive wheel 24 to drive the track and (ii) interact with the idler wheel 26 and/or the roller wheels $28_1$-$28_6$ to guide the track 22 to maintain proper track alignment and prevent de-tracking, in which case the drive/guide lug $48_i$ is both a drive lug and a guide lug.

In this embodiment, the drive/guide lugs $48_1$-$48_N$ interact with the drive wheel 24 in order to cause the track 22 to be driven, and also interact with the idler wheel 26 and the roller wheels $28_1$-$28_6$ in order to guide the track 22 as it is driven by the drive wheel 24 to maintain proper track alignment and prevent de-tracking. The drive/guide lugs $48_1$-$48_N$ are thus used to both drive the track 22 and guide the track 22 in this embodiment.

In this example of implementation, the drive/guide lugs $48_1$-$48_N$ are arranged in a single row disposed longitudinally along the inner side 45 of the track 22. The drive/guide lugs $48_1$-$48_N$ may be arranged in other manners in other examples of implementation (e.g., in a plurality of rows that are spaced apart along the widthwise direction of the track 22).

In this embodiment, each drive/guide lug $48_i$ is an elastomeric drive/guide lug in that it comprises elastomeric material 67. The elastomeric material 67 can be any polymeric material with suitable elasticity. More particularly, in this embodiment, the elastomeric material 67 includes rubber. Various rubber compounds may be used and, in some cases, different rubber compounds may be present in different areas of the drive/guide lug $48_i$. In other embodiments, the elastomeric material 67 may include another elastomer in addition to or instead of rubber (e.g., polyurethane elastomer). The drive/guide lugs $48_1$-$48_N$ may be provided on the inner side 45 in various ways. For example, in this embodiment, the drive/guide lugs $48_1$-$48_N$ are provided on the inner side 45 by being molded with the carcass 36.

The ground-engaging outer side 47 comprises a ground-engaging outer surface 75 of the carcass 36 and a tread pattern 40 to enhance traction on the ground. The tread pattern 40 comprises a plurality of traction projections $58_1$-$58_T$ projecting from the ground-engaging outer surface 75, spaced apart in the longitudinal direction of the endless track 22 and engaging the ground to enhance traction. The traction projections $58_1$-$58_T$ may be referred to as "tread projections" or "traction lugs".

The traction lugs $58_1$-$58_T$ may have any suitable shape. In this embodiment, each of the traction lugs $58_1$-$58_T$ has an elongated shape and is angled, i.e., defines an oblique angle θ (i.e., an angle that is not a right angle or a multiple of a right angle), relative to the longitudinal direction of the track 22. The traction lugs $58_1$-$58_T$ may have various other shapes in other examples (e.g., curved shapes, shapes with straight parts and curved parts, etc.).

Figure 6:
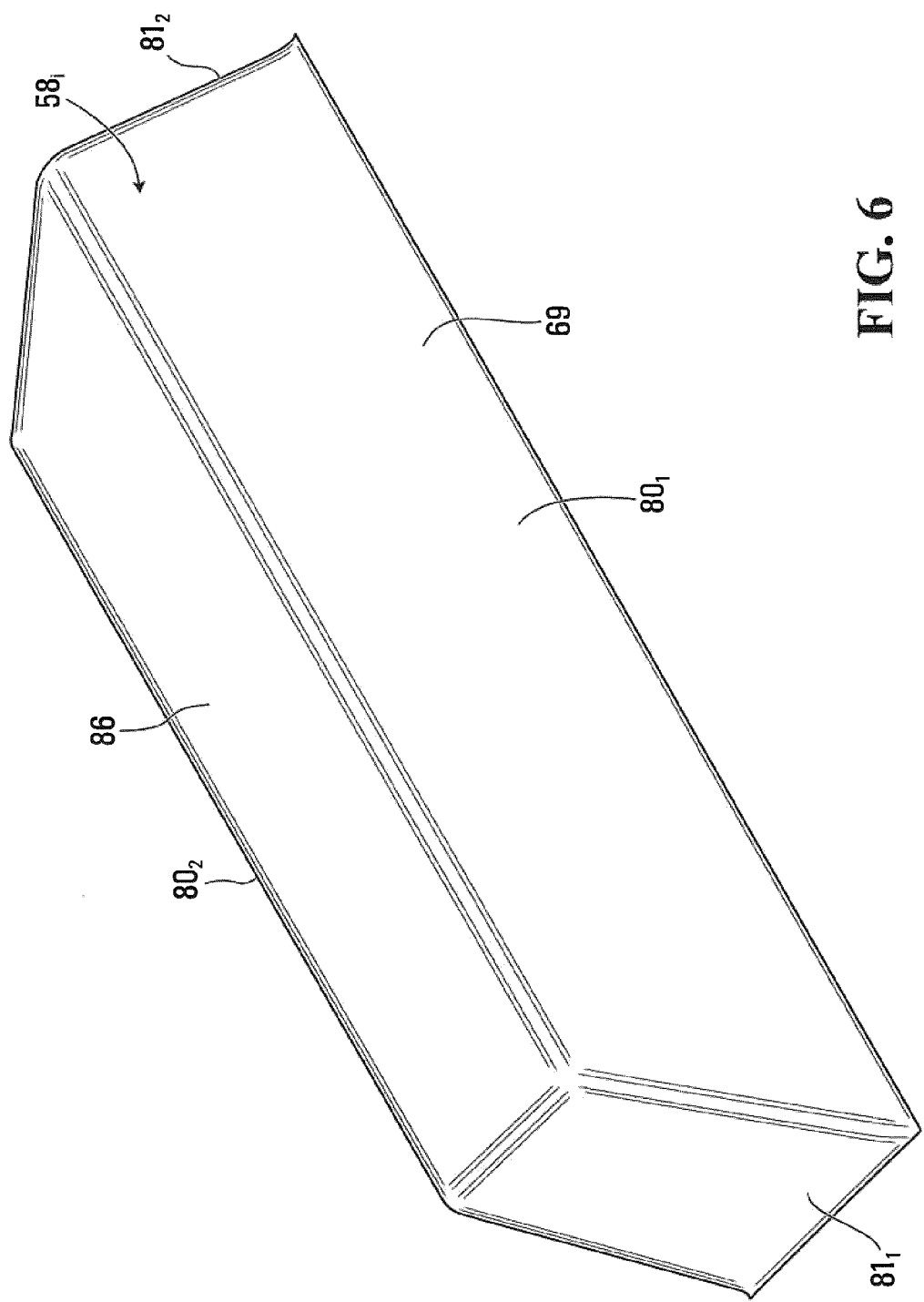
FIG. 6 shows a perspective view of traction projection of the track.

As shown in FIG. 6, each traction lug $58_i$ has a periphery 69 which includes a front surface $80_1$, a rear surface $80_2$, two side surfaces $81_1$, $81_2$, and a top surface 86. The front surface $80_1$ and the rear surface $80_2$ are opposed to one another in the longitudinal direction of the track 22. The two side faces $81_1$, $81_2$ are opposed to one another in the widthwise direction of the track 22. In this embodiment, the front surface $80_1$, the rear surface $80_2$, and the side surfaces $81_1$, $81_2$ are substantially straight. The periphery 69 of the traction lug $58_i$ may have any other shape in other embodiments (e.g., the front surface $80_1$, the rear surface $80_2$, and/or the side surfaces $81_1$, $81_2$ may be curved). The traction lug $58_i$ has a front-to-rear dimension $L_L$ in the longitudinal direction of the track 22, a side-to-side dimension $L_W$ in the widthwise direction of the track 22, and a height H in the thickness direction of the track 22.

In this embodiment, each traction lug $58_i$ is an elastomeric traction lug in that it comprises elastomeric material 41. The elastomeric material 41 can be any polymeric material with suitable elasticity. More particularly, in this embodiment, the elastomeric material 41 includes rubber. Various rubber compounds may be used and, in some cases, different rubber compounds may be present in different areas of the traction lug $58_i$. In other embodiments, the elastomeric material 41 may include another elastomer in addition to or instead of rubber (e.g., polyurethane elastomer). The traction lugs $58_1$-$58_T$ may be provided on the ground-engaging outer side 27 in various ways. For example, in this embodiment, the traction lugs $58_1$-$58_T$ are provided on the ground-engaging outer side 27 by being molded with the carcass 36.

The track 22 may be constructed in various other manners in other embodiments. For example, in some embodiments, the track 22 may have recesses or holes that interact with the drive wheel 24 in order to cause the track 22 to be driven (e.g., in which case the drive/guide lugs $48_1$-$48_N$ may be used only to guide the track 22 without being used to drive the track 22, i.e., they may be "guide lugs" only), and/or the ground-engaging outer side 47 of the track 22 may comprise various patterns of traction lugs.

The drive wheel 24 is rotatable by power derived from the prime mover 14 to drive the track 22. That is, power generated by the prime mover 14 and delivered over the powertrain of the agricultural vehicle 10 can rotate a driven axle, which causes rotation of the drive wheel 24, which in turn imparts motion to the track 22.

Figure 7:
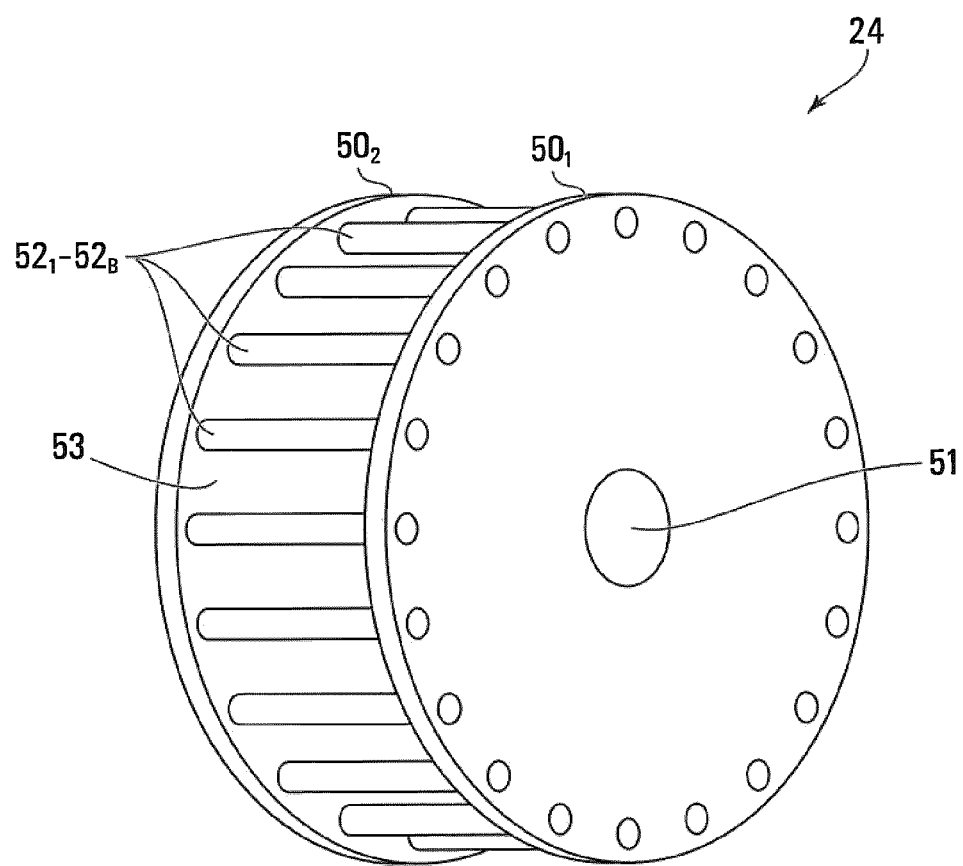
FIG. 7 shows a drive wheel of a track-engaging assembly of the track system.

With additional reference to FIG. 7, in this embodiment, the drive wheel 24 comprises a drive sprocket comprising a plurality of drive members $52_1$-$52_B$ spaced apart along a circular path to engage the drive/guide lugs $48_1$-$48_N$ of the track 22 in order to drive the track 22. The drive wheel 24 and the track 22 thus implement a "positive drive" system. More particularly, in this embodiment, the drive wheel 24 comprises two side discs $50_1$, $50_2$ which are co-centric and turn about a common axle 51 and between which the drive members $52_1$-$52_B$ extend near respective peripheries of the side discs $50_1$, $50_2$. In this example, the drive members $52_1$-$52_B$ are thus drive bars that extend between the side discs $50_1$, $50_2$. The drive wheel 24 and the track 22 have respective dimensions allowing interlocking of the drive bars $52_1$-$52_B$ of the drive wheel 24 and the drive/guide lugs $48_1$-$48_N$ of the track 22. Adjacent ones of the drive bars $52_1$-$52_B$ define an interior space 53 between them to receive one of the drive/guide lugs $48_1$-$48_N$. Adjacent ones of the drive/guide lugs $48_1$-$48_N$ define an inter-lug space 39 between them to receive one of the drive bars $52_1$-$52_B$. The drive/guide lugs $48_1$-$48_N$ and the drive bars $52_1$-$52_B$ have a regular spacing that allows interlocking of the drive/guide lugs $48_1$-$48_N$ and the drive bars $52_1$-$52_B$ over a certain length of the drive wheel's circumference.

The drive wheel 24 may be configured in various other ways in other embodiments. For example, in other embodiments, the drive wheel 24 may not have any side discs such as the side discs $50_1$, $50_2$. As another example, in other embodiments, instead of being drive bars, the drive members $52_1$-$52_B$ may be drive teeth that are distributed circumferentially along the drive wheel 24 or any other type of drive members. As another example, in embodiments where the track 22 comprises recesses or holes, the drive wheel 24 may have teeth that enter these recesses or holes in order to drive the track 22. As yet another example, in some embodiments, the drive wheel 24 may frictionally engage the inner side 45 of the track 22 in order to frictionally drive the track 22 (i.e., the drive wheel 24 and the track 22 may implement a "friction drive" system).

Figure 8:
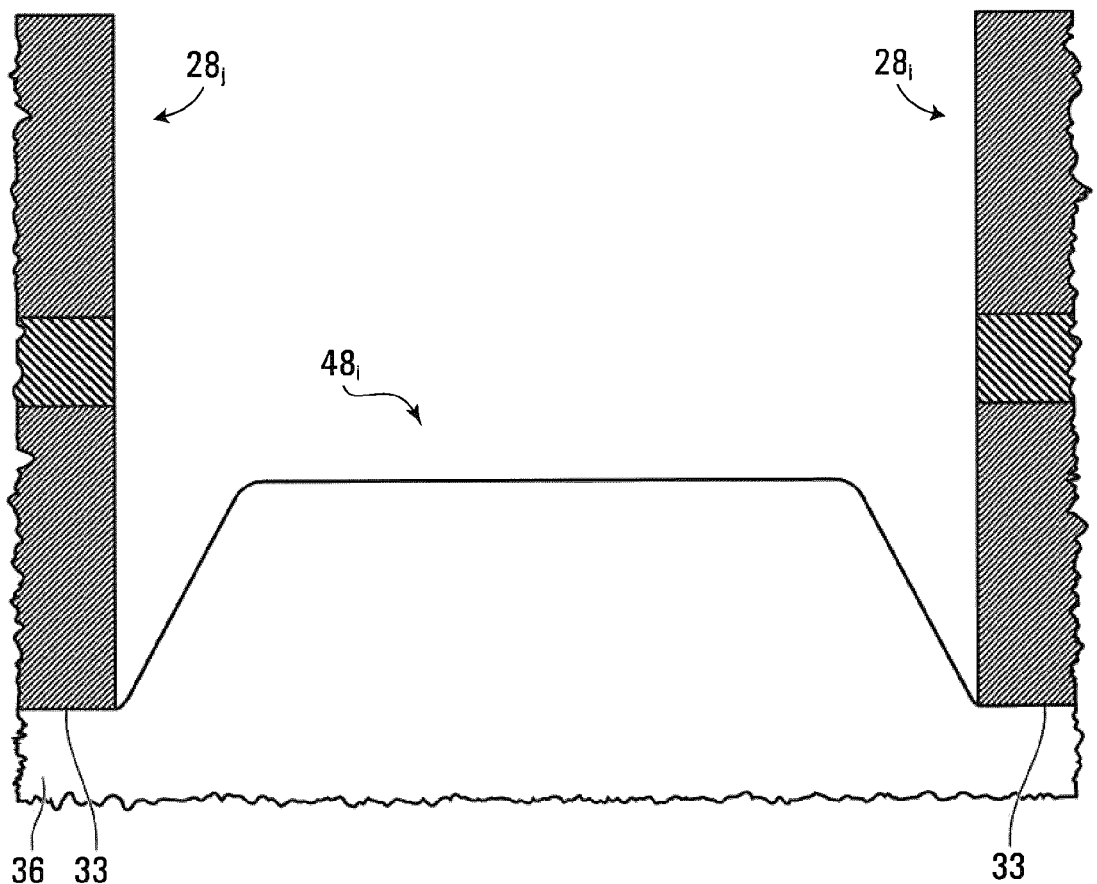
FIG. 8 shows a drive/guide projection of the track.

The front idler wheel 26 and the roller wheels $28_1$-$28_6$ are not driven by power supplied by the prime mover 14, but are rather used to do at least one of supporting part of the weight of the agricultural vehicle 10 on the ground via the track 22, guiding the track 22 as it is driven by the drive wheel 24, and tensioning the track 22. More particularly, in this embodiment, the front idler wheel 26 is a leading idler wheel which maintains the track 22 in tension and helps to support part of the weight of the agricultural vehicle 10 on the ground via the track 22. As shown in FIG. 8, the roller wheels $28_1$-$28_6$ roll on a rolling path 33 of the inner side 45 of the track 22 along the bottom run 66 of the track 22 to apply the bottom run 66 on the ground. In this case, as they are located between frontmost and rearmost ones of the wheels of the track system $16_i$, the roller wheels $28_1$-$28_6$ can be referred to as "mid-rollers".

The traction lugs $58_1$-$58_T$ can be designed to enhance their resistance to deterioration during use. Notably, in this embodiment, a blowout resistance of each traction lug $58_i$ can be enhanced to prevent or at least reduce a potential for blowout of the traction lug $58_i$ under repeated loads which may induce heat buildup within it. Also, a wear resistance of the traction lug $58_i$ may be enhanced such that the traction lug $58_i$ wears less rapidly. This enhanced resistance to deterioration of the traction lugs $58_1$-$58_T$ may be particularly useful in situations where the track 22 experiences significant roading on hard road surfaces, such as, for example, when the agricultural vehicle 10 travels on paved roads between fields or other agricultural sites.

More particularly, in this embodiment, the blowout resistance of a traction lug $58_i$ is greater than a threshold.

Figure 9:
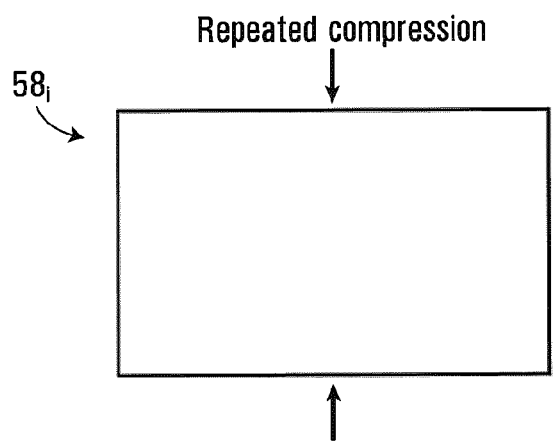
FIG. 9 shows an example of a test to measure a blowout resistance of a traction projection of the track.

A test may be performed to measure the blowout resistance of the traction lug $58_i$. For example, with additional reference to FIG. 9, a sample of the traction lug $58_i$ of specified dimensions can be repeatedly compressed at a specified frequency by applying a load causing a specified deformation (e.g., compression) and measuring one or more parameters indicative of the blowout resistance of the traction lug $58_i$.

For instance, in some embodiments, the test may be a standard test. In some cases, the blowout resistance of the traction lug $58_i$ may be measured under ASTM D-623 (Method A) conditions (e.g., sample dimensions, load, frequency and deformation specified by ASTM D-623).

For example, according to ASTM D-623 (Method A), a sample of the traction lug $58_i$ of specified dimensions (i.e., a diameter of 17.8+/−0.1 mm and a height of 25+/−0.15 mm) can be taken from the traction lug $58_i$, subjected to a specified preload (i.e., 110 lbs), conditioned at a specified temperature (i.e., 100° C.) for a specified period of time (i.e., 25 minutes), and repeatedly compressed by causing a specified deformation (e.g., compression) (i.e., 0.250 inches in amplitude) at a specified frequency (i.e., 30 Hz) in order to measure one or more parameters indicative of the blowout resistance of the traction lug $58_i$. This may be performed using a Goodrich flexometer.

Various parameters may be measured during the test to assess the blowout resistance of the traction lug $58_i$. For example:

a) A blowout time B at which blowout of the sample of the traction lug $58_i$ occurs. The blowout time B can be measured by repeatedly loading the sample of the traction lug $58_i$ until blowout (i.e., it explodes) and noting a period of time (e.g., in minutes) to reach that blowout point or as otherwise specified by the test if standard. For example, in some embodiments, the blowout time B at which blowout of the sample of the traction lug $58_i$ occurs may be at least 15 minutes, in some cases at least 20 minutes, in some cases at least 25 minutes, in some cases at least 30 minutes, in some cases at least 40 minutes, in some cases at least 50 minutes, and in some cases even more (e.g., at least 60, 80 or 100 minutes); and/or b) A blowout temperature $T_b$ of the sample of the traction lug $58_i$ at which blowout of the sample of the traction lug $58_i$ occurs. The blowout temperature $T_b$ can be measured by repeatedly loading the sample of the traction lug $58_i$ until blowout (i.e., it explodes) and measuring that temperature at a hottest point of the sample of the traction lug $58_i$ (e.g., using a temperature probe) or as otherwise specified by the test if standard. For example, in some embodiments, the blowout temperature $T_b$ of the sample of the traction lug $58_i$ at which blowout of the sample of the traction lug $58_i$ occurs may be at least 180° C., in some cases at least 190° C., in some cases at least at least 200° C., in some cases at least 210° C., and in some cases even more (e.g., at least 220° C.)

The blowout time B of the sample of the traction lug $58_i$ and/or the blowout temperature $T_b$ of the sample of the traction lug $58_i$ may have any other suitable value in other examples of implementation.

Also, in this embodiment, the wear resistance of a traction lug $58_i$ is greater than a threshold. For example, in some embodiments, the wear resistance of the traction lug $58_i$ may be expressed as an abrasion resistance of the traction lug $58_i$.

A test may be performed to measure the wear resistance of the traction lug $58_i$. For example, in some embodiments, a sample of the traction lug $58_i$ of specified dimensions can be moved across a surface of an abrasive sheet mounted to a revolving drum to measure the wear of the traction lug $58_i$ as a volume loss in cubic millimeters or an abrasion resistance index in percent. In some cases, the test may be a standard test. For instance, in some embodiments, the wear resistance of the traction lug $58_i$, expressed as its abrasion resistance, may be measured under ASTM D-5963 conditions (e.g., sample dimensions; loading conditions; etc.).

For example, a sample of the traction lug $58_i$ of dimensions specified by ASTM D-5963 (i.e., a diameter of 16+/−0.2 mm and a minimum thickness of 6 mm) can be taken from the traction lug $58_i$ and moved against a surface of an abrasive sheet mounted to a revolving drum as specified by ASTM D-5963 and measuring one or more parameters indicative of the abrasion resistance of the traction lug $58_i$.

For instance, in some embodiments, a volume loss in cubic millimeters of the sample of the traction lug $58_i$ (according to abrasion loss method A) may be no more than 110 $mm^3$, in some cases no more than 100 $mm^3$, more than 90 $mm^3$, in some cases no more than 80 $mm^3$, and in some cases even less (e.g., no more than 70 $mm^3$ or 60 $mm^3$). The volumetric loss of the sample of the traction lug $58_i$ may have any other suitable value in other examples of implementation.

Enhancement of the resistance to deterioration of the traction lugs $58_1$-$58_T$, including their resistance to blowout, may be achieved in various ways in various embodiments.

Figure 10:
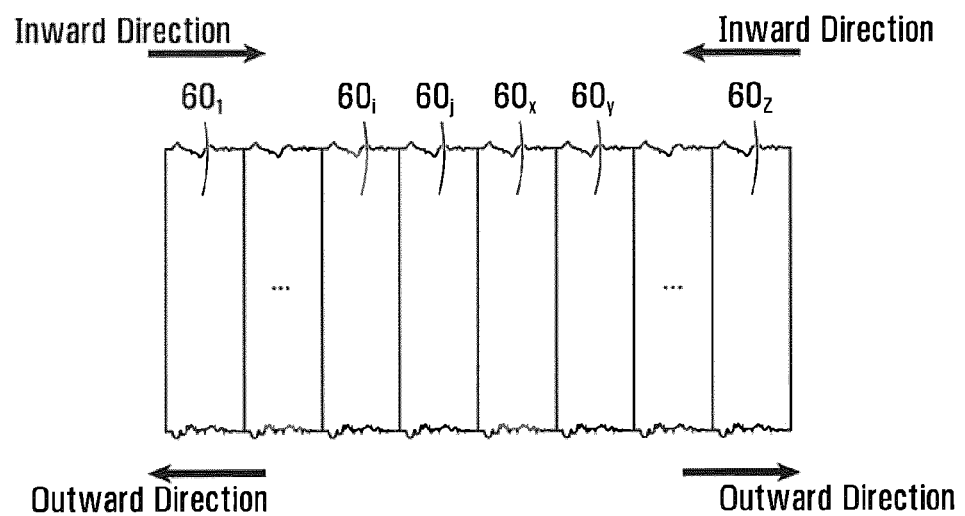
FIG. 10 shows zones of different materials of a traction projection of the track.

In this embodiment, each traction lug $58_i$ is characterized by a material distribution profile to enhance its resistance to deterioration, including its blowout resistance and its wear resistance. With additional reference to FIG. 10, the material distribution profile is designed such that the traction lug $58_i$ has a material composition defining an arrangement of zones of different materials $60_1$-$60_Z$. These different materials $60_1$-$60_Z$ belong to different classes of materials (i.e., polymers, metals, ceramics and composites) and/or exhibit substantially different values of a given material property (e.g., a modulus of elasticity, tensile strength, hardness, friction coefficient, crack growth resistance, etc.). The arrangement of zones of different materials $60_1$-$60_Z$ is designed into the traction lug $58_i$. That is, the arrangement of zones of different materials $60_1$-$60_Z$ does not occur by chance (e.g., during manufacturing or use of the traction lug $58_i$), but is rather achieved by a careful material selection and distribution within the traction lug $58_i$ during design of the track 22.

The arrangement of zones of different materials $60_1$-$60_Z$ may comprise two, three, four, five or more zones of different materials. Also, while the arrangement of zones of different materials $60_1$-$60_Z$ may comprise any selection of different materials, in some embodiments, the arrangement of zones of different materials $60_1$-$60Z$ may comprise a plurality of zones of different elastomeric materials (i.e., two, three, four, five or more zones of different elastomeric materials). For example, such different elastomeric materials may include different rubbers, thermoplastic elastomers (TPE) such as polyurethane elastomers, and/or other elastomers.

The zones of different materials $60_1$-$60_Z$ may be provided in any suitable way using one or more manufacturing processes, such as, for example, a molding process (e.g., an injection molding process, a compression molding process, etc.), an extrusion process (e.g., a coextrusion process), a pouring process, a gluing process, a coating process, a heat treatment, a penetrating treatment (e.g., an electromagnetic radiation treatment, etc.), and/or any other suitable manufacturing process. Examples of how the zones of different materials $60_1$-$60_Z$ may be provided in various embodiments are discussed below.

More particularly, in this embodiment, the arrangement of zones of different materials $60_1$-$60_Z$ is configured such that the traction lug $58_i$ exhibits a desired variation in blowout resistance across the arrangement of zones of different materials $60_1$-$60_Z$. Also, in this embodiment, the arrangement of zones of different materials $60_1$-$60_Z$ is configured such that the traction lug $58_i$ exhibits a desired variation in wear resistance across the arrangement of zones of different materials $60_1$-$60_Z$. Each of these variations is "desired" in that it is designed into the traction lug $58_i$ by the careful material selection and distribution within the traction lug $58_i$ to create the arrangement of zones of different materials $60_1$-$60_Z$ during design of the track 22 such that the blowout resistance and the wear resistance vary in an intended manner. In that sense, these desired variations can also be referred to as a "selected", "predetermined", "intended" or "controlled" variation in blowout resistance and wear resistance.

Specifically, in this example of implementation, the blowout resistance increases inwardly, i.e., in a direction away from the periphery 69 of the traction lug $58_i$ towards an inside of the traction lug $58_i$. Thus, in this example, the blowout resistance of an inner material $60_x$ of the traction lug $58_i$ is greater than the blowout resistance of an outer material $60_y$ of the traction lug $58_i$. The inner material $60_x$ and the outer material $60_Y$ are respectively referred to as being "inner" and "outer" in that the inner material $60_x$ is disposed inwardly of the outer material $60_y$, i.e., the outer material $60_y$ is disposed between the inner material $60_x$ and the periphery 69 of the traction lug $58_i$ (e.g., and may extend to the periphery 69 of the traction lug $58_i$). The outer material $60_y$ is thus closer to the periphery 69 of the traction lug $58_i$ than the inner material $60_x$ (e.g., and may extend to the periphery 69 of the traction lug $58_i$). The blowout resistance of the inner material $60_x$ of the traction lug $58_i$ may be measured by subjecting a sample of the inner material $60_x$ to a test as described above and measuring one or more parameters indicative of its blowout resistance, such as the blowout temperature $T_b$ of the sample of the inner material $60_x$ and/or the blowout time B of the sample of the inner material $60_x$. A similar procedure may be followed for measuring the blowout resistance of the outer material $60_y$ of the traction lug $58_i$.

Also, in this example of implementation, the wear resistance increases outwardly, i.e., in a direction towards the periphery 69 of the traction lug $58_i$. More particularly, in this example, the wear resistance of the outer material $60_y$ of the traction lug $58_i$ is greater than the wear resistance of the inner material $60_x$ of the traction lug $58_i$. The wear resistance of the outer material $60y$ of the traction lug $58_i$ may be measured by subjecting a sample of the outer material $60_y$ to a test as described above and measuring one or more parameters indicative of its wear resistance, such as its abrasion resistance. A similar procedure may be followed for measuring the wear resistance of the inner material $60_x$ of the traction lug $58_i$.

The traction lug $58_i$ is thus more resistant to blowout in its internal region which would be more susceptible to blowout conditions, while being more wear resistance in its external region which is exposed to wearing effects.

The variation in blowout resistance and wear resistance across the arrangement of zones of different materials $60_1$-$60_Z$ of the traction lug $58_i$ may be configured in various ways. For example, in various embodiments, this may include one or more gradients of blowout resistance and wear resistance across the zones of different materials $60_1$-$60_Z$ of the traction lug $58_i$, where each gradient can be a discrete gradient or a continuous gradient.

i. Discrete Gradient

In some embodiments, the arrangement of zones of different materials $60_1$-$60_Z$ of the traction lug $58_i$ may exhibit a discrete gradient of blowout resistance and a discrete gradient of wear resistance. A discrete gradient of blowout resistance or wear resistance is a discrete variation of the blowout resistance or wear resistance in a specified direction across the arrangement of zones of different materials $60_1$-$60_Z$ of the traction lug $58_i$. In such embodiments, adjacent ones of the zones of different materials $60_1$-$60_Z$ which define the discrete gradient of blowout resistance or wear resistance are discrete zones such that the blowout resistance or the wear resistance varies in discrete steps across the traction lug $58_i$. A zone is "discrete" in that its dimension along the specified direction of the discrete gradient is macroscopically measurable.

Figure 11:
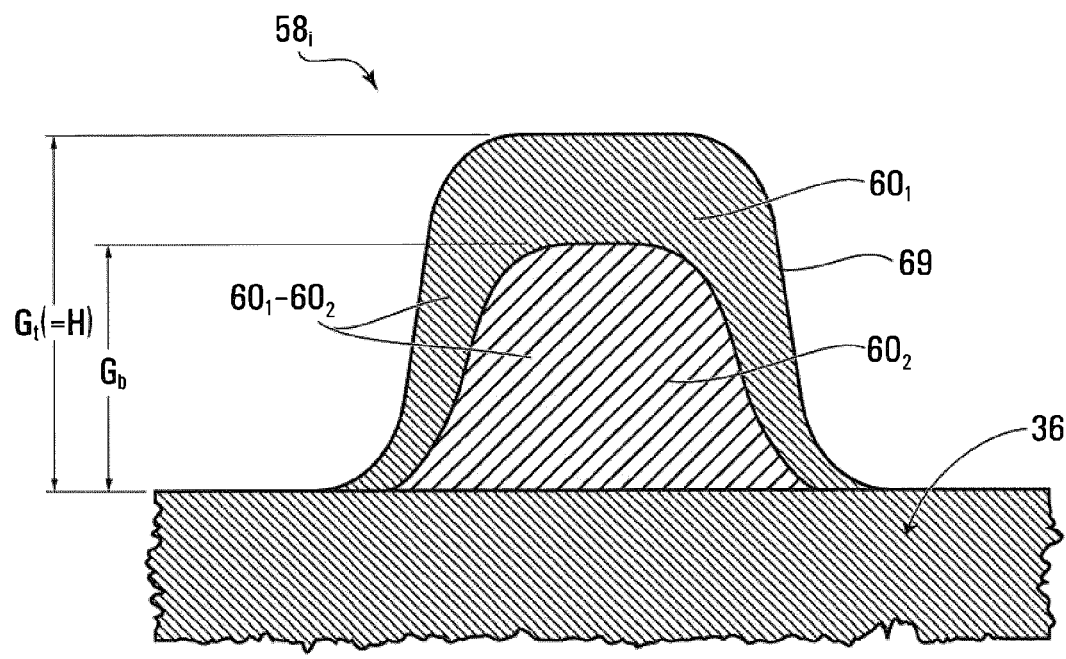
FIG. 11 shows an example of an embodiment of a traction projection of the track that comprises two zones of different materials varying in blowout resistance and wear resistance.

For example, FIG. 11 shows an example of an embodiment in which the blowout resistance and the wear resistance vary in discrete steps such that the zones of different materials $60_1$-$60_Z$ have different blowout resistance and wear resistance values.

In this embodiment, the arrangement of zones of different materials $60_1$-$60_Z$ includes an outer material $60_1$ and an inner material $60_2$. The outer material $60_1$ is an external material and forms the periphery 69 of the traction lug $58_i$ while the inner material $60_2$ is a core material forming a core of the traction lug $58_i$. In this example, the inner material $60_2$ has a higher blowout resistance than the outer material $60_1$. On the other hand, the outer material $60_1$ has a higher wear resistance than the inner material $60_2$. Thus, the inner material $60_2$ is more resistant to blowout than the outer material $60_1$, whereas the outer material $60_1$ is more resistant to wear than the inner material $60_2$.

To this end, in some embodiments, the outer material $60_1$ and the inner material $60_2$ may be different elastomeric materials (e.g., rubbers, thermoplastic elastomers (TPE)

such as polyurethane elastomers, and/or other elastomers). For instance, in some embodiments, the inner material $60_2$ and the outer material $60_1$ may be different types of rubber. For example, the different rubber compounds constituted by the inner material $60_2$ and the outer material $60_1$ may differ by having different base polymers, different concentration and/or types of carbon black, different content of dienes, and/or different content of sulfur or other vulcanizing and/or in any other suitable manner.

In other embodiments, one or both of the inner material $60_2$ and the outer material $60_1$ may be other types of materials, including non-elastomeric materials. For example, in some embodiments, the outer material $60_1$ may be thermoplastic olefin (TPO), nylon, polytetrafluoroethylene (PTFE) or any other thermoplastic material. As another example, in some embodiments, the inner material $60_2$ may comprise metal, rigid polymer (e.g., thermoplastic), ceramic or any other material with a suitable blowout resistance, i.e., a blowout resistance higher than that of the outer material $60_1$.

There may be any suitable proportions of the outer material $60_1$ and the inner material $60_2$ in the traction lug $58_i$. For example, in some embodiments, a ratio $V_b/V_t$ of a volume $V_b$ of the inner material $60_2$ over a volume $V_t$ of the traction lug $58_i$ may be at least 0.1, in some cases at least 0.2, in some cases at least 0.3, in some cases at least 0.4, in some cases at least 0.5, in some cases at least 0.6, and in some cases even more (e.g., at least 0.8 or 0.9). In some embodiments, a ratio $G_b/G_t$ of a dimension $G_b$ of the inner material $60_2$ in a given direction (e.g., in the thickness direction of the track 22) over a dimension $G_t$ of the traction lug $58_i$ in that given direction (e.g., the height H of the traction lug 58) may be at least 0.1, in some cases at least 0.2, in some cases at least 0.3, in some cases at least 0.4, in some cases at least 0.5, in some cases at least 0.6, and in some cases even more (e.g., at least 0.8 or 0.9).

Although a particular material distribution profile is shown in the above embodiment for illustrative purposes to show an example of the arrangement of zones of different materials $60_1$-$60_Z$, various other different material distribution profiles may be realized in other embodiments to create various other arrangements of zones of different materials $60_1$-$60_Z$ by varying a number of zones, sizes, geometries and locations of zones, and/or materials of the zones. For instance, in other embodiments, the number of zones and the geometry of the zones may be varied. For example, in some embodiments, more zones of different materials $60_1$-$60_Z$ may be provided to achieve a more complex blowout resistance and wear resistance variation profile.

By selecting a number of zones, sizes, geometries and locations of zones, and/or materials of the zones, it is possible to regulate how the blowout resistance and the wear resistance change across the arrangement of zones of different materials $60_1$-$60_Z$ of the traction lug $58_i$. In the above embodiment, the blowout resistance and the wear resistance vary across the traction lug $58_i$ in a discrete step, which corresponds to a transition between the outer material $60_1$ and the inner material $60_2$. There may be two (2), three (3), four (4), five (5) or more (e.g., 10 or 20) discrete steps in other embodiments. By providing a large number of zones of different materials $60_1$-$60_Z$ having different blowout resistance and wear resistance values, it is possible to approximate a smooth variation in blowout resistance and wear resistance, the actual granularity of which will depend upon the number and size of the zones of different materials $60_1$-$60_Z$.

Figure 12:
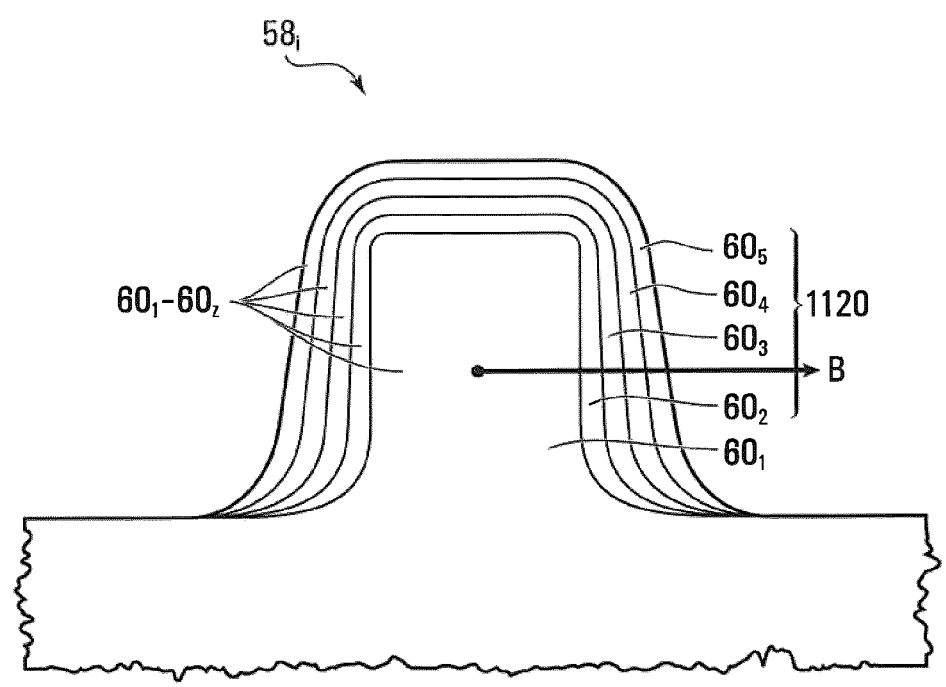
FIG. 12 shows another example of an embodiment of a traction projection of the track that comprises multiple layered zones of different materials varying in blowout resistance and wear resistance.

FIG. 12 shows another embodiment of a traction lug $58_i$ in which the blowout resistance and the wear resistance vary in discrete steps such that the zones of different materials $60_1$-$60_Z$ have different blowout resistance and wear resistance values.

More particularly, in this embodiment, the arrangement of zones of different materials $60_1$-$60_Z$ of the traction lug $58_i$ comprises a core material $60_1$ and a plurality of layered materials, including a first layered material $60_2$, a second layered material $60_3$, a third layered material $60_4$ and a fourth layered material $60_5$, which make up a layered area 1120. In this example, the layered materials $60_2$-$60_5$ are approximately equal in thickness. Different ones of the layered materials $60_2$-$60_5$ may have different thicknesses in other examples.

Figure 13A:
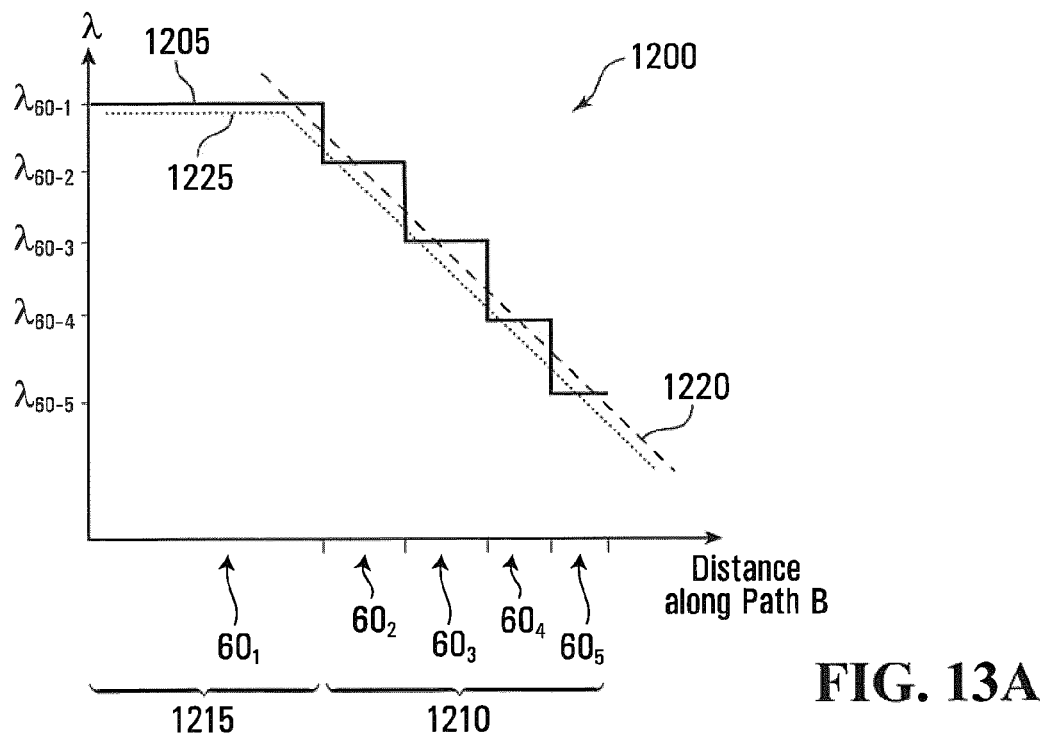
FIG. 13A shows a graph representing a variation in blowout resistance in relation to a distance within the traction projection of FIG. 12.

FIG. 13A is a graph 1200 showing an example of how the blowout resistance 1205 of the traction lug $58_i$ varies as a function of distance within the traction lug $58_i$ in a specified direction represented by line B shown in FIG. 12. As the distance along line B is varied, the blowout resistance of the traction lug $58_i$ takes on five (5) different values $\lambda_{60\text{-}1}$, $\lambda_{60\text{-}2}$, $\lambda_{60\text{-}3}$, $\lambda_{60\text{-}4}$ and $\lambda_{60\text{-}5}$, each of which corresponds to the blowout resistance of a respective one of the zones of different materials $60_1$-$60_5$. As such, the function of the blowout resistance 1205 takes the form of a step function, each step corresponding to a respective one of the zones of different materials $60\text{-}_1$-$60_Z$. The layered materials $60_2$-$60_5$ are represented in range 1210 of the graph 1200, while range 1215 represents the core material $60_1$. In range 1210, the blowout resistance of the traction lug $58_i$ approximates a linear function 1220. As such, the layered area 1120 can be viewed as exhibiting an approximately linear variation in blowout resistance with an actual granularity defined by the steps in the function of the blowout resistance 1205 corresponding to the layered materials $60_2$-$60_5$. The overall function blowout resistance 1205 across line B in this example can thus be considered to approximate smooth line 1225.

In this example, the values of blowout resistance $\lambda_{60\text{-}1}$, $\lambda_{60\text{-}2}$, $\lambda_{60\text{-}3}$, $\lambda_{60\text{-}4}$ and $\lambda_{60\text{-}5}$ vary from one material to the next by approximately the same value, giving steps of approximately equal height in the vertical direction of the graph 1200. Similarly, the layered materials $60_2$-$60_5$ have approximately equal thicknesses such that the steps have approximately equal width in the horizontal (distance along line B) direction of the graph 1200. The linear function 1220 which is approximated by the function of the blowout resistance 1205 in the layered area 1120 can be varied by altering the thicknesses of the layered materials $60_2$-$60_5$ and/or by varying the blowout resistance values $\lambda_{60\text{-}2}$, $\lambda_{60\text{-}3}$, $\lambda_{60\text{-}4}$ and $\lambda_{60\text{-}5}$ of the layered materials $60_2$-$60_5$. For example, the rate of change (slope) of the approximated linear function 1220 may be decreased by increasing the thickness or decreasing the variation in the blowout resistance in the different materials.

In a similar manner, the wear resistance of the traction lug $58_i$ varies as a function of distance within the traction lug $58_i$ in a specified direction represented by line B shown in FIG. 12. However, the wear resistance defines an inverse relationship to the blowout resistance. That is, while the blowout resistance is highest at the core material $60_1$ and lowest at the layered material $60_5$, the wear resistance is highest at the layered material $60_5$ and lowest at the core material $60_1$.

Figure 13B:
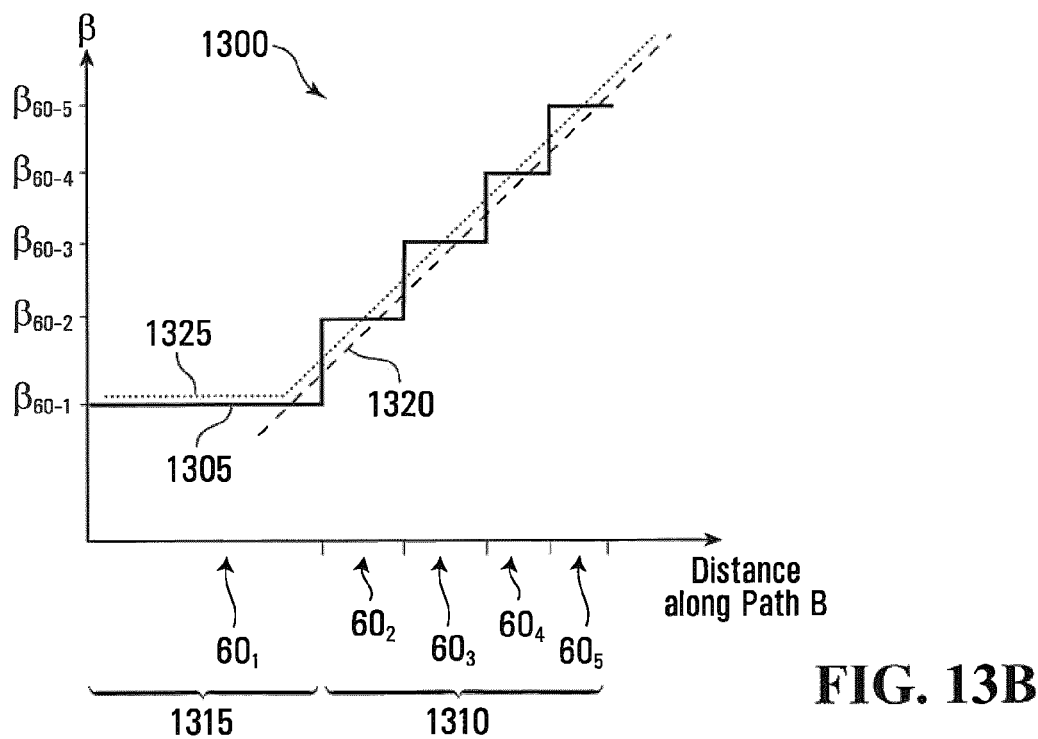
FIG. 13B shows a graph representing a variation in wear resistance in relation to a distance within the traction projection of FIG. 12.

FIG. 13B is a graph 1300 showing an example of how the wear resistance 1305 of the traction lug $58_i$ varies as a function of distance within the traction lug $58_i$ in a specified direction represented by line B shown in FIG. 11. As the distance along line B is varied, the wear resistance of the traction lug $58_i$ takes on five (5) different values $\beta_{60-1}$, $\beta_{60-2}$, $\beta_{60-3}$, $\beta_{60-4}$ and $\beta_{60-5}$, each of which corresponds to the wear resistance of the material of a respective one of the materials $60_1$-$60_5$. As such, the function of the wear resistance 1305 takes the form of a step function, each step corresponding to a respective one of the zones of different materials $60_1$-$60_Z$. The layered materials $60_2$-$60_5$ are represented in range 1310 of the graph 1300, while range 1315 represents the core material $60_1$. In range 1310, the wear resistance of the traction lug $58_i$ approximates a linear function 1320. As such, the layered area 1120 can be viewed as exhibiting an approximately linear variation in wear resistance with an actual granularity defined by the steps in the function of the wear resistance 1305 corresponding to the layered materials $60_2$-$60_5$. The overall wear resistance 1305 function across line B in this example can thus be considered to approximate smooth line 1325.

The manner in which approximation of a function is determined may affect the thicknesses of the zones of different materials $60_1$-$60_Z$ required to approximate the function. For example, in some embodiments, the linear function 1220 may be arrived at by taking a weighted average of the blowout resistance values $\lambda_{60-1}$, $\lambda_{60-2}$, $\lambda_{60-3}$, $\lambda_{60-4}$ and $\lambda_{60-5}$ of each material, wherein the thickness of each material determines the weight, and dividing the result by the average thickness of a material. This may provide the slope of the linear function 1220. A similar procedure may be implemented to approximate the linear function 1320. Other models may be used in other embodiments to approximate functions of variation of a material property depending on the method used.

Depending on the materials available, on the blowout resistance and wear resistance of available materials, and on the inter-compatibility of materials from which the traction lug $58_i$ may be made, it may not be practical in some embodiments to obtain equidistant blowout resistance and wear resistance values for each of the zones of different materials $60_1$-$60_Z$. As such, in some cases, the materials used or available may not provide equal heights for each step in the function of the blowout resistance 1205 and/or the wear resistance 1305. In such cases, the thicknesses of the zones of different materials $60_1$-$60_Z$ may be modified to adjust the weight of each material such that, on average, the linear function 1220 and the linear function 1320 are still approximated. This would have the effect of altering the horizontal length of the steps in the graphs 1200, 1300 to compensate for inequality in the vertical height of the steps, so as to achieve an approximation of linear functions 1220, 1320. Alternatively, the blowout resistance and wear resistance of other materials may be adjusted, insofar as possible or practical, such as to approximate the linear functions 1220, 1320. This would have the effect of varying the vertical height of steps in the graphs 1200, 1300 to compensate for another step that is too tall or too short so as to approximate the linear functions 1220, 1320.

In this embodiment, the arrangement of zones of different materials $60_1$-$60_Z$ has been selected based on blowout resistance and wear resistance values so as to achieve an approximation, according to a selected curve-fitting method, of the linear functions 1220, 1320. In other embodiments, the blowout resistance and wear resistance variation may be a nonlinear variation of a function of distance within the traction lug $58_i$. In yet other embodiments, there may be no approximation of a linear or other function. In such embodiments, the various materials for the zones of different materials $60_1$-$60_Z$ may be selected on the basis of the desired blowout resistance and wear resistance in each zone of the zones of different materials $60_1$-$60_Z$, without regards to any linear or other function.

Figure 14:
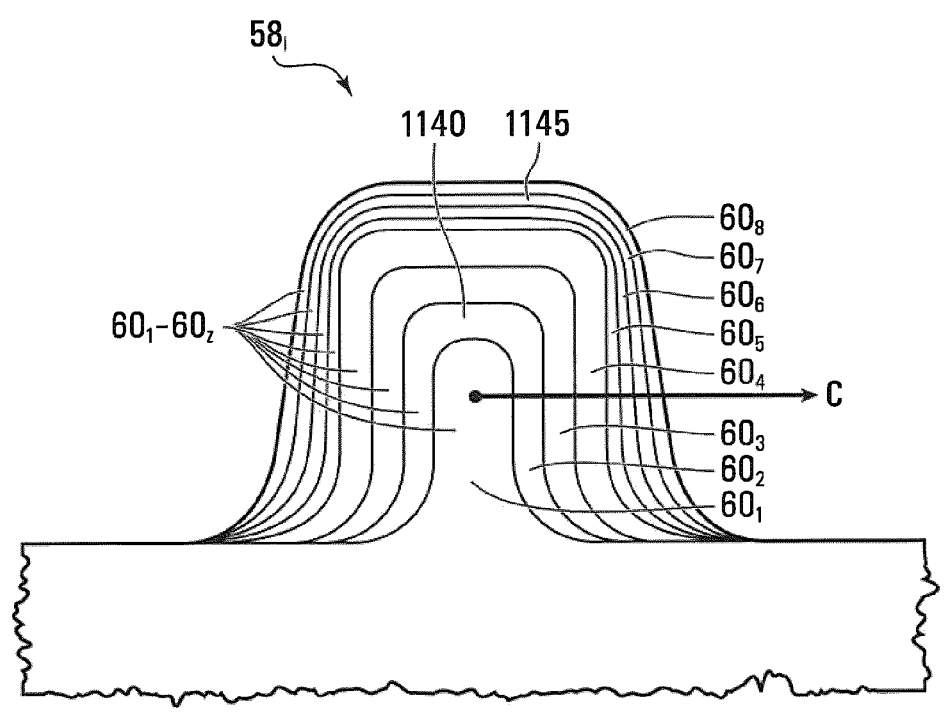
FIG. 14 shows another example of an embodiment of a traction projection of the track that comprises zones of different materials with different thicknesses.

FIG. 14 shows another example of an embodiment of a traction lug $58_i$ in which the blowout resistance and the wear resistance vary in discrete steps such that the zones of different materials $60_1$-$60_Z$ have different blowout resistance and wear resistance values. In this embodiment, an entirety of the traction lug $58_i$ is made up of zones of different materials $60_1$-$60_8$ that may be considered layered materials. Also, in this embodiment, the traction lug $58_i$ comprises an inner area 1140 where the layered materials form thicker layered materials $60_1$-$60_4$ and an outer area 1145 where the layered materials form thinner layered materials $60_5$-$60_8$.

Figure 15A:
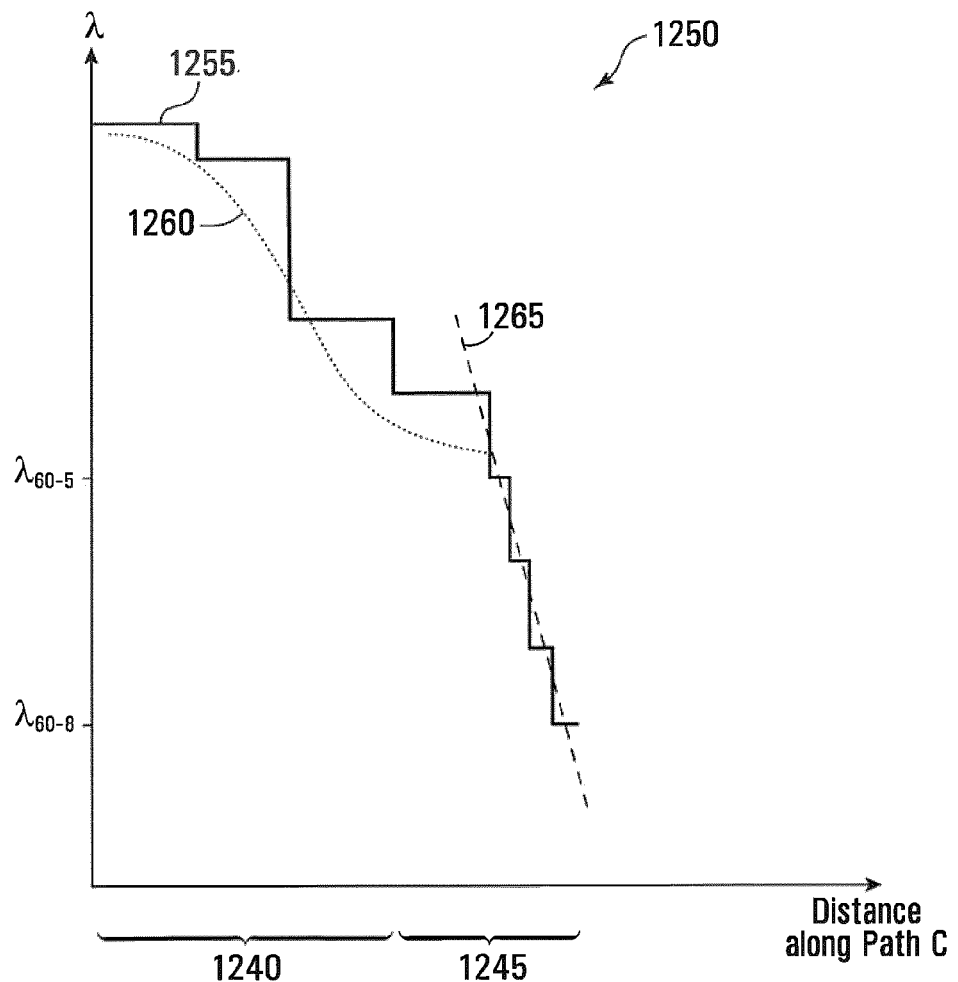
FIG. 15A shows a graph representing a variation in blowout resistance along the traction projection of FIG. 14.

FIG. 15A shows a graph 1250 showing the function of the blowout resistance 1255 of the traction lug $58_i$ as it varies along line C shown in FIG. 14. In this example, the blowout resistance decreases in successive ones of the materials $60_1$-$60_8$ along the line C. Also, in this example, due to the discrete nature of the zones of different materials $60_1$-$60_8$, the function of the blowout resistance 1255 still features steps, however the steps are not of equal size.

A first range 1240 of the graph 1250 represents the thicker layered materials $60_1$-$60_4$ in the inner area 1140 of the traction lug $58_i$. These thicker layered materials $60_1$-$60_4$ do not vary equally. In particular, the two first thicker layered materials $60_1$, $60_2$ have a particularly high blowout resistance. Subsequent thicker layered materials $60_3$, $60_4$ have approximately the same thickness as the two first thicker layered materials $60_1$, $60_2$, but they have lower blowout resistance values. In the inner area 1140, the variation of blowout resistance is not equal amongst the different materials, and the function of the blowout resistance 1255 in this first range 1240 approximates a polynomial function 1260. In this case, the materials of the thicker layered materials $60_1$-$60_4$ have been selected so as to achieve an approximation, according to a selected curve-fitting method, of the polynomial function 1260. In other cases, it may not be necessary or desired to approximate a linear, polynomial, or other function. For example, the materials of the thicker layered materials $60_1$-$60_4$ may simply be selected on the basis of a desired blowout resistance in their respective areas.

A second range 1245 of the graph 1250 represents the thinner layered materials $60_5$-$60_8$. These thinner layered materials $60_5$-$60_8$ are in the outer area 1145 of the traction lug $58_i$ and provide a reduced blowout resistance region. While a lower blowout resistance may be acceptable towards the exterior of the traction lug $58_i$, it may be desired to avoid strong discontinuities, that is, large differences, in the blowout resistance of adjacent ones of the zones of different materials $60_1$-$60_8$. In particular, it may be desired to avoid having a relatively highly blowout resistant material adjacent a relatively non-blowout resistant material to avoid a stress concentration at the interface between these materials, which could lead to cracking or tearing at the interface between these materials. In this example, strong discontinuities are avoided by providing four thinner layered materials $60_5$-$60_8$ varying in blowout resistance from a first value $\lambda_{60-5}$ that is near the blowout resistance of the adjacent thicker layered material $60_4$ gradually to a fourth value $\lambda_{60-8}$ at the outermost thinner layered material $60_8$. The function of the blowout resistance 1255 in the second range 1245 decreases as a step function with relatively equal steps which approximate a linear function 1265. Again, the function 1255 in the second range 1245 need not have equal-sized steps and may not necessarily approximate a linear or other function.

In the above example, two areas 1140, 1145 of the traction lug $58_i$ correspond to two regions 1240, 1245 of the graph approximating different functions. In other examples, a single function (linear, polynomial or other) may be approximated by the entire function of the blowout resistance 1255. For example, if the thicker layered materials $60_1$-$60_4$ have an approximately corresponding step size in the function 1255, the thinner layered materials $60_5$-$60_8$ may be characterized by variations in blowout resistance yielding step sizes proportional to their thinner area such that the zones of different materials $60_1$-$60_8$ together yield a step function that approximates a straight line.

In a similar manner to that described above in regard of FIG. 15A, the wear resistance of the traction lug $58_i$ also varies in function of the distance within the traction lug $58_i$. More specifically, a function of the wear resistance of the traction lug $58_i$ varies along line C shown in FIG. 14. However, contrary to the blowout resistance, in this example, the wear resistance increases in successive ones of the zones of different materials $60_1$-$60_8$ along the line C.

Figure 15B:
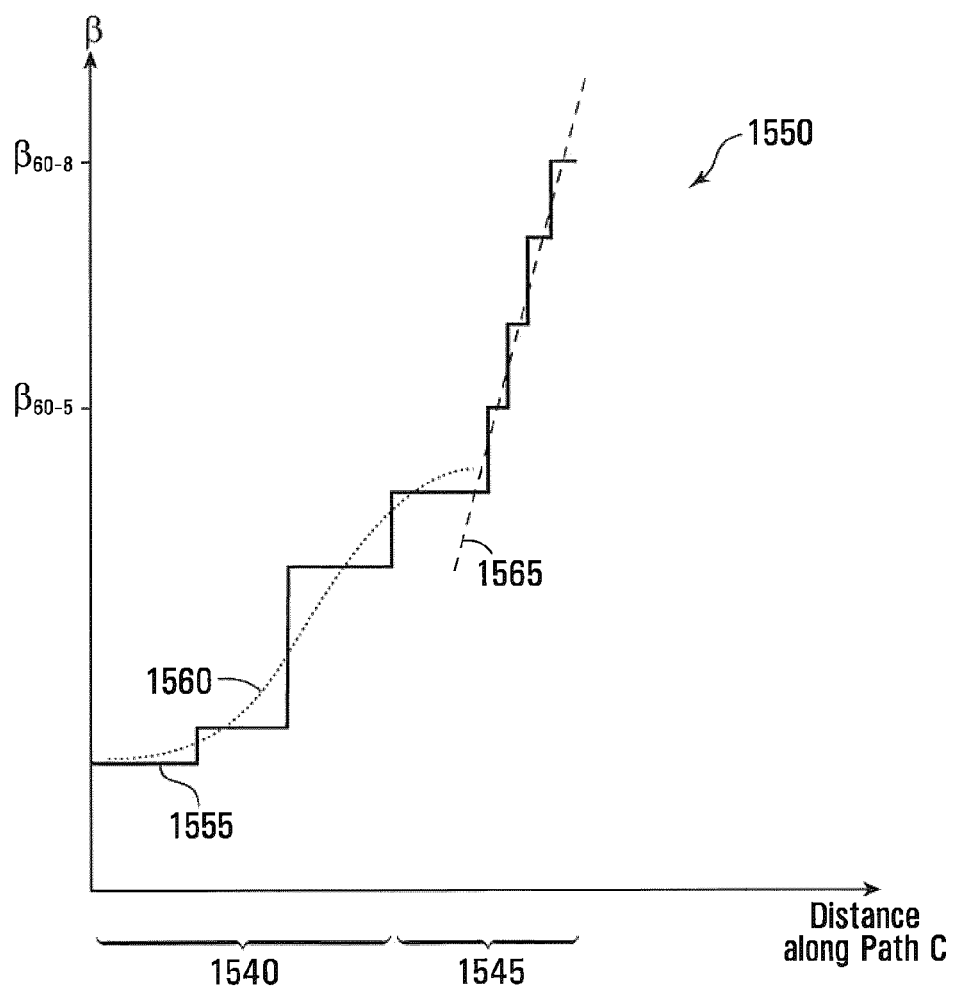
FIG. 15B shows a graph representing a variation in wear resistance across the traction projection of FIG. 14.

FIG. 15B shows a graph 1550 showing the function of the wear resistance 1555 of the traction lug $58_i$ as it varies along line C shown in FIG. 14. In this example, the wear resistance increases in successive ones of the zones of different materials $60_1$-$60_8$ along the line C. Also, in this example, due to the discrete nature of the zones of different materials $60_1$-$60_8$, the function of the wear resistance 1555 still features steps, however the steps are not of equal size.

A first range 1540 of the graph 1550 represents the thicker layered materials $60_1$-$60_4$ in the inner area 1140 of the traction lug $58_i$. These thicker layered materials $60_1$-$60_4$ do not vary equally. In particular, the two first thicker layered materials $60_1$ and $60_2$ have a particularly low wear resistance. Subsequent thicker layered materials $60_3$ and $60_4$ have approximately the same thickness as the two first thicker layered materials $60_1$ and $60_2$, but they have significantly higher wear resistance values. In the inner area 1140, the variation of wear resistance is not equal amongst the different zones of different materials $60_1$-$60_4$, and the function of the wear resistance 1555 in this first range 1540 approximates a polynomial function 1560. In this case, the materials of the thicker layered materials $60_1$-$60_4$ have been selected so as to achieve an approximation, according to a selected curve-fitting method, of the polynomial function 1560. In other cases, it may not be necessary or desired to approximate a linear, polynomial, or other function. For example, the materials of the thicker layered materials $60_1$-$60_4$ may simply be selected on the basis of a desired wear resistance in their respective areas.

A second range 1545 of the graph 1550 represents the thinner layered materials $60_5$-$60_8$. These thinner layered materials $60_5$-$60_8$ are in the outer area 1145 of the traction lug $58_i$ and provide an increased wear resistance region. While a higher wear resistance may be desired towards the exterior of the traction lug $58_i$, it may be desired to avoid strong discontinuities, that is, large differences, in the wear resistance of adjacent ones of the zones of different materials $60_1$-$60_8$. In particular, it may be desired to avoid having a relatively highly wear resistant material adjacent a relatively non-wear resistant material to avoid a stress concentration at the interface between these materials, which could lead to cracking or tearing at the interface between these materials. In this example, strong discontinuities are avoided by providing four thinner layered materials $60_5$-$60_8$ varying in wear resistance from a first value $\beta_{60-5}$ that is near the wear resistance of the adjacent thicker layered material $60_4$ gradually to a fourth value $\beta_{60-8}$ at the outermost thinner layered material $60_8$. The function of the wear resistance 1555 in the second range 1545 increases as a step function with relatively equal steps which approximate a linear function 1565. Again, the function 1555 in the second range 1545 need not have equal-sized steps and may not necessarily approximate a linear or other function.

In the above examples, two areas 1140, 1145 of the traction lug $58_i$ correspond to two regions of each of the graphs 1250, 1550 approximating different functions. In other examples, a single function (linear, polynomial or other) may be approximated by the entire function of the blowout resistance 1255 or the wear resistance 1555. For example, if the thicker layered materials $60_1$-$60_4$ have an approximately corresponding step size in the function 1255, the thinner layered materials $60_5$-$60_8$ may be characterized by variations in blowout resistance yielding step sizes proportional to their thinner area such that the zones of different materials $60_1$-$60_8$ together yield a step function that approximates a straight line. Likewise, if the thicker layered materials $60_1$-$60_4$ have an approximately corresponding step size in the function 1555, the thinner layered materials $60_5$-$60_8$ may be characterized by variations in wear resistance yielding step sizes proportional to their thinner area such that the zones of different materials $60_1$-$60_8$ together yield a step function that approximates a straight line.

Fewer zones of different materials $60_1$-$60_Z$ may be provided to reduce the complexity or cost of manufacture of the traction lug $58_i$ (e.g., certain ones of the thicker or thinner layered materials may be omitted).

In some of the embodiments considered above, the zones of different materials $60_1$-$60z$ are layered materials disposed on all sides of the traction lug $58_i$. In other embodiments, the layered materials may be provided only on one part of the traction lug $58_i$, such as for example only on one side thereof. Also, in other embodiments, the zones of different materials $60_1$-$60_Z$ may take forms other than layers (e.g., blocks, bars or plates).

Individual ones of the discrete zones of different materials $60_1$-$60_Z$ defining a discrete gradient of blowout resistance and wear resistance, such as those considered in the embodiments discussed above, may be provided in various ways.

For example, in some embodiments, individual ones of the zones of different materials $60_1$-$60_Z$ may be separate amounts of material which are provided separated and interconnected together. This may be done in various ways using various manufacturing processes. For instance, various molding processes may be used to make the traction lug $58_i$ with its arrangement of zones of different materials $60_1$-$60Z$. For example, in some embodiments, a compression molding process may be used in which different pieces of material, which are to ultimately form the zones of different materials $60_1$-$60_Z$, may be placed in a mold such that, after molding, they form the arrangement of zones of different materials $60_1$-$60_Z$. As another example, in other embodiments, an injection molding process may be used in which amounts of different materials which are to ultimately form the zones of different materials $60_1$-$60z$, may be placed in a mold such that, after molding, they form the arrangement of zones of different materials $60_1$-$60_Z$.

Interconnection of the zones of different materials $60_1$-$60_Z$ of the traction lug $58_i$ may be effected in various ways.

For instance, in some embodiments, adjacent ones of the zones of different materials $60_1$-$60_Z$ may be adhesively bonded using an adhesive between them. In some cases, these zones of different materials may be created by individually molding each of them prior to gluing them together. Alternatively, in some cases, and particularly if the materials are layered materials, the zones of different materials may be created by cutting or otherwise machining them out of a substrate prior to gluing them together. Any suitable adhesive may be used. For instance, in some cases, various commercially-available adhesives (e.g., Chemlok™ adhesives) may be used to adhesively bond adjacent different materials (e.g., rubber/metal using a Chemlok™ 253X adhesive, polyurethane/rubber using a Chemlok™ 213 adhesive, polyurethane/metal using a Chemlok™ 213 adhesive, etc.). In other cases, proprietary adhesives may be used.

In other embodiments, adjacent ones of the zones of different materials $60_1$-$60Z$ may be chemically bonded to one another. That is, a chemical bond may be formed between these adjacent materials during manufacturing of the traction lug $58_i$. The materials of these zones of different materials may thus be bonded to one another without any adhesive. Chemical bonding between materials implies an additional constraint to be considered when selecting the materials for the zones of different materials $60_1$-$60_Z$ of the traction lug $58_i$, namely the intercompatibility of the materials. In particular, the materials used in adjacent zones of different materials must be capable of bonding to one another under the right conditions. The conditions must then be applied to ensure that bonding takes place. For example, in some embodiments, one type of rubber may chemically bond with another type of rubber, UHMW may chemically bond with rubber, TPO may chemically bond with rubber, etc.

There are several ways of creating the traction lug $58_i$ with adjacent ones of the zones of different materials $60_1$-$60_Z$ that are chemically bonded. For instance, in some embodiments, a mold having removable portions corresponding to the various materials may be first filled with a first material, then have one or more removable portions removed, then subsequently filled (in the resulting cavities) with a second material, and so on until every zone of the zones of different materials $60_1$-$60Z$ is filled. In other embodiments, a first mold can be used to form a first material $60_i$ of the traction lug $58_i$, the resulting structure being removed from the mold and laced into another mold for forming a second material $60_j$ of the traction lug $58_i$ and so forth for every material. In other embodiments, several different materials may be simultaneously injected into a given mold to form adjacent zones of different materials $60_1$-$60_Z$ of the traction lug $58_i$. In yet other embodiments, pieces of different materials, which will eventually make up respective ones of the zones of different materials $60_1$-$60Z$ are prepared in advance, for instance by molding them or by cutting or otherwise machining them out of a substrate. The pieces are then arranged in their appropriate order and relative positions, and the overall arrangement may be consolidated, for instance by placing it in a heated mold until chemical bonding takes place. If rubber is used, different rubber pieces, such as strips for layered materials, may be vulcanized while together while arranged in their proper relative positions/order, such as to form the traction lug $58_i$ having different zones of different materials that are chemically bonded together. The pieces need not be all arranged and bonded together at once. For instance, if different temperatures are required to cause bonding between different materials, the process may first be applied to the zones of different materials having the highest bonding temperature prior and subsequently applied to the zones of different materials having lower bonding temperatures.

The above-described examples of techniques may be combined together to form certain ones of the zones of different materials $60_1$-$60_Z$ of the traction lug $58_i$ using one technique and other ones of these zones of different materials $60_1$-$60_Z$ using another technique.

Instead of, or in addition to, being adhesively or chemically bonded together, in some embodiments, adjacent ones of the zones of different materials $60_1$-$60_Z$ of the traction lug $58_i$ may be mechanically interlocked. That is, a material $60_i$ and a material $60_j$ adjacent to the material $60_i$ may be in a mechanical interlock relationship in which they are interconnected via a given one of the material $60_i$ and the material $60_j$ extending into the other one of the material $60_i$ and the material $60_j$. More specifically, a first one of the material $60_i$ and the material $60_j$ comprises an interlocking space into which extends an interlocking portion of a second one of the material $60_i$ and the material $60_j$. The interlocking space may comprise one or more holes, one or more recesses, and/or one or more other hollow areas. This mechanical interlock relationship restrains movement of the material $60_i$ and the material $60_j$ relative to one another, Geometric details omitted from many of the embodiments discussed above may be included in the zones of different materials $60_1$-$60_Z$ to implement such a mechanical interlock relationship.

Figure 16:
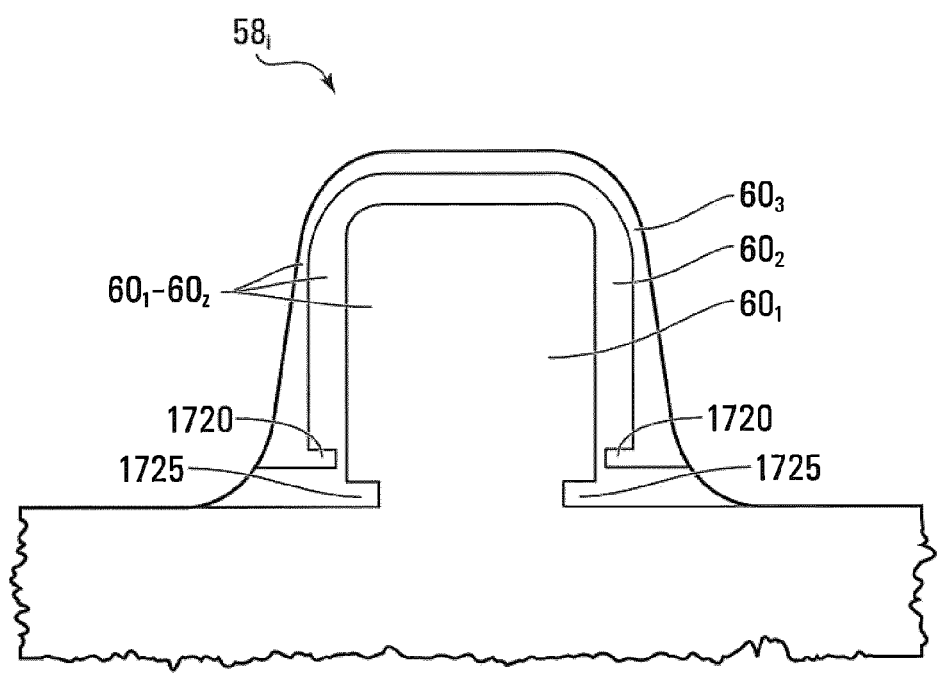
FIG. 16 shows another example of an embodiment of a traction projection of the track that comprises zones of different materials that are mechanically interlocked.

For example, FIG. 16 shows an embodiment in which the arrangement of zones of different materials $60_1$-$60z$ of the traction lug $58_i$ comprise layered materials $60_2$, $60_3$ and a core material $60_1$, where each of the layered materials $60_2$, $60_3$ comprises an interlocking protuberance 1720, 1725 (e.g., a ridge) that fits into a corresponding interlocking groove in an adjacent material. Various other mechanical interlocking arrangements are possible in other embodiments.

Adjacent ones of the zones of different materials $60_1$-$60_Z$ of the traction lug $58_i$ may be mechanically interlocked in various ways. For example, in some cases, adjacent ones of the zones of different materials $60_1$-$60_Z$ of the traction lug $58_i$ may be mechanically interlocked by separately creating the different zones of different materials (e.g. by molding separately or cutting or otherwise machining out of a substrate) and then assembling them together such as by snap-fitting them together. In some cases, an adhesive may be applied prior to snap-fitting materials together. As another example, in some cases, adjacent ones of the zones of different materials $60_1$-$60_Z$ of the traction lug $58_i$ may be mechanically interlocked by being overmolded. Using mechanical interlocking, it is not necessarily required for the materials to chemically bond. As such, overmolding may take place using incompatible materials, that is, materials not susceptible to form chemical bonds together during the overmolding process, or using temperatures or orders of molding not susceptible to cause chemical bonding between the materials. In some cases, it may be desired to have both chemical bonding and mechanical interlocking for increased robustness. In such a case the manners of assembling the materials together may include the methods of forming chemical bonds described above.

While the above embodiments illustrate examples of making and interconnecting the zones of different materials $60_1$-$60_Z$ of the traction lug $58_i$ to create the arrangement of zones of different materials $60_1$-$60_Z$ and the desired variation in blowout resistance and wear resistance, various other techniques may be used in other embodiments to provide the zones of different materials $60_1$-$60_Z$ of the traction lug $58_i$. For instance, in some embodiments, a material $60_i$ may be a coated material provided by painting, depositing, spattering or spraying a coating over another material $60_j$. The coating may be a coating of polyurethane, acrylic, or any other suitable material, and may have a thickness of about 1 to 1.5 mil (thousandth(s) of an inch) or any other suitable value.

Also, any suitable combination of the above techniques for creating the zones of different materials $60_1$-$60_Z$ of the traction lug $58_i$ may be used. For example, in some embodiments, individual materials on the interior of the traction lug $58_i$ may be overmolded (e.g., with chemical bonding and/or mechanical interlocking), while an outer protective layer (e.g., a skin or a cap) can be applied overtop the traction lug $58_i$ and held thereon by adhesive bonding or by mechanical interlocking. Alternatively, a spray-on layer may be provided instead of or additionally to, the protective layer as an outermost layer.

ii. Continuous Gradient

In some embodiments, the arrangement of zones of different materials $60_1$-$60_Z$ of the traction lug $58_i$ may exhibit a continuous gradient of blowout resistance and a continuous gradient of wear resistance. A continuous gradient of blowout resistance or wear resistance is a continuous variation of the blowout resistance or wear resistance in a specified direction across the arrangement of zones of different materials $60_1$-$60_Z$ of the traction lug $58_i$. In such embodiments, adjacent ones of the zones of different materials $60_1$-$60_Z$ which define the continuous gradient of blowout resistance or wear resistance are infinitesimal zones. A zone is "infinitesimal" in that it is sufficiently small and has a sufficiently small difference in blowout resistance or wear resistance with an adjacent zone that its dimension along the specified direction of the continuous gradient is not macroscopically measurable.

Figure 17:
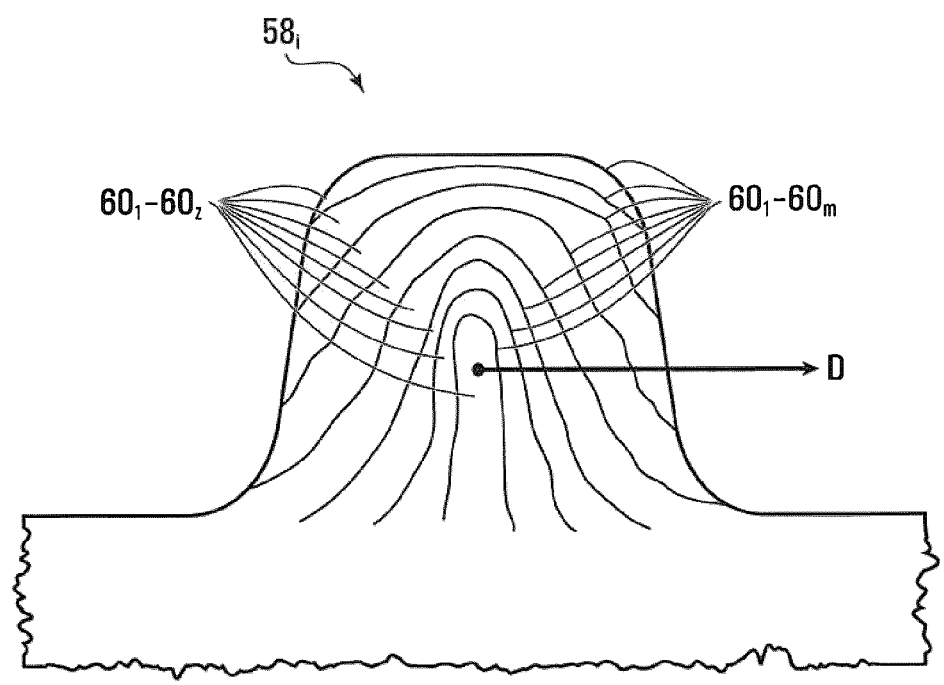
FIG. 17 shows another example of an embodiment of a traction projection of the track that comprises zones of different materials that vary in blowout resistance and wear resistance.
Figure 18A:
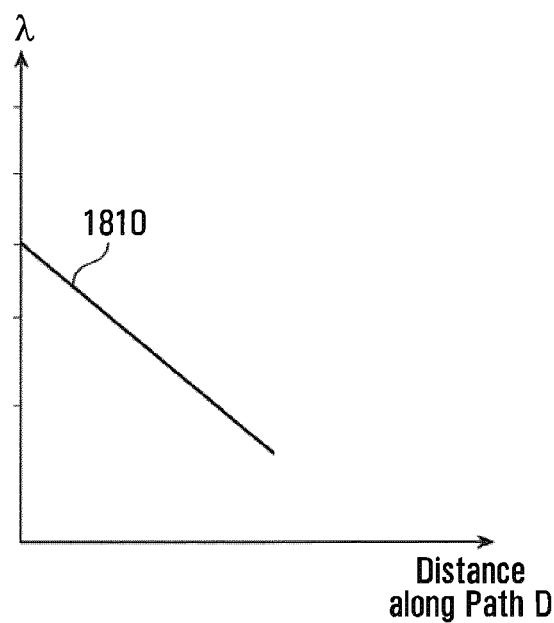
FIG. 18A shows a graph representing a variation in blowout resistance along the traction projection of FIG. 17.
Figure 18B:
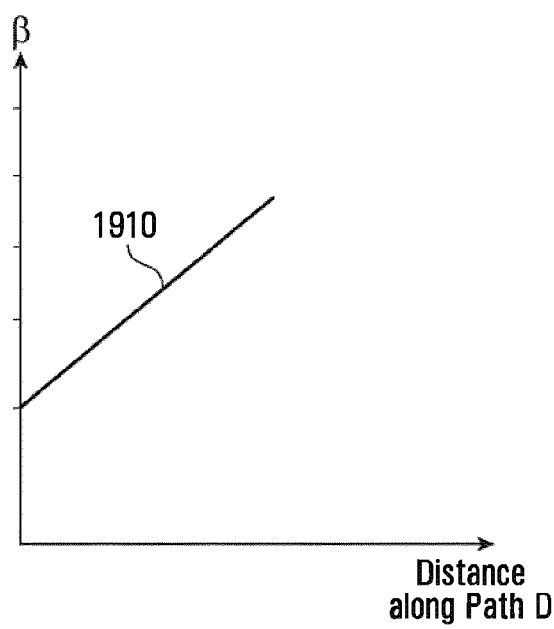
FIG. 18B shows a graph representing a variation in wear resistance along the traction projection of FIG. 17.

For example, FIG. 17 illustrates an example of an embodiment in which the variation of the blowout resistance and wear resistance across the arrangement of zones of different materials $60_1$-$60_Z$ of the traction lug $58_i$ includes a continuous gradient of blowout resistance and a continuous gradient of wear resistance. In this embodiment, each continuous gradient extends throughout the traction lug $58_i$. FIGS. 18A and 18B respectively illustrate a graph of the variation of the blowout resistance and the wear resistance as a function of distance along line D shown in FIG. 17. In this example, the spatial variation of the blowout resistance is a generally linear function 1810. Similarly, the spatial variation of the wear resistance is a generally linear function 1910. Although the linear functions 1810, 1910 are shown as perfectly straight, actual realizations of the continuous gradients of blowout resistance and wear resistance in some embodiments may not be perfect and imperfections may result in the variations not being perfectly linear.

In FIG. 17, certain materials $60_1$-$60_M$ of the arrangement of zones of different materials $60_1$-$60_Z$ defining the continuous gradients of blowout resistance and wear resistance are represented. The materials $60_1$-$60_m$ are represented as isolines, where each isoline links points at which the value of the blowout resistance is the same and the value of the wear resistance is the same. The space between adjacent zones of different materials $60_i$, $60_j$ includes other ones of the infinitesimal zones of different materials $60_1$-$60_Z$ defining the continuous gradients of blowout resistance and wear resistance.

A continuous gradient of blowout resistance and/or wear resistance may be configured in various other ways in other embodiments. For example, although in the above embodiment it is a linear function, the spatial variation of the blowout resistance defining the continuous gradient may be a more complex function (e.g., a polynomial function) in other embodiments. As another example, while in the above embodiment it extends throughout the entire traction lug $58_i$, the continuous gradients of blowout resistance and/or wear resistance may only exist in a limited area of the traction lug $58_i$.

Individual ones of the infinitesimal zones of different materials $60_1$-$60Z$ defining continuous gradients of blowout resistance and wear resistance, such as those considered in the embodiments discussed above, may be provided in various ways.

For example, in some embodiments, the value of the blowout resistance or the wear resistance may be related to a mixture of two or more constituents which make up material of the traction lug $58_i$. For instance the relative concentration of each of the constituents may determine the blowout resistance or wear resistance of the resulting material. In such a case, any suitable fabrication method that permits gradual variation in the relative concentration of each of the constituents may be used to produce a continuous gradient of blowout resistance and/or wear resistance.

As an example, in some embodiments, a twin injection molding technique may be used whereby two ingredients are injected into a mold. The relative intensity of the two jets of ingredients may be varied as the mold fills. Alternatively, rather than to vary the intensity of jets injecting the ingredients into the mold, the two jets may be located at different locations of the mold, and the ingredients may be injected in liquefied form into the mold such that they mix between the two jets and form the traction lug $58_i$ having a gradual change in relative concentration of the two ingredients varying for almost uniquely a first ingredient near a corresponding first jet location to almost uniquely a second ingredient near a corresponding second jet. As another example, in some embodiments, the traction lug $58_i$ may be made by taking two or more solid pieces, each made of one of two ingredients, and placing them in relative position and heating them until they melt and mix at their interface.

While the above examples describe the use of two ingredients to achieve a continuous gradient of blowout resistance and wear resistance, it should be understood that three or more ingredients may be used as well, wherein the relative concentration of the three or more ingredients determines the value of a property such as the blowout resistance or wear resistance. In some cases, not all ingredients need to be present throughout the traction lug $58_i$, since one ingredient may have a concentration of 0% in some areas. As such, in a three-or-more-ingredient scheme, there may be a variation of the relative concentration of two ingredients, followed by a variation of the relative concentration of two other ingredients (including, or not, a common ingredient with the first variation). Any other schemes for combining ingredients in varying relative concentration may be used to achieve a desired variation in blowout resistance or wear resistance.

As another example, in some embodiments, two or more zones of the arrangement of zones of different materials $60_1$-$60_Z$ may be formed by subjecting a common base material to a treatment causing at least two areas of the common base material to become different from one another, thus constituting two zones of different materials.

For instance, in some embodiments, a continuous gradient of blowout resistance or wear resistance may be achieved by a controlled heat treatment. For example, in some cases, an injection molding process may be used in which a rubber to make the traction lug $58_i$ is injected into a mold at a high temperature and, as the molding process progresses, the temperature may be reduced to cause a smooth variation in the blowout resistance or wear resistance. Other heat treatments may be used in other cases.

As another example, in some embodiments, a continuous gradient of blowout resistance or wear resistance may be achieved by providing a traction lug $58_i$ made of a single base material which is altered by applying a penetrating treatment such that the alteration induces a smooth change in the blowout resistance. For instance, in some cases, a material from which to make the traction lug $58_i$ may be radiated with a certain penetrating (e.g. UV) radiation that causes a change in the material characteristics and that diminishes in intensity with depth. In other cases, an additive or impurity may be added to a material from which to make the traction lug $58_i$ from the outside in. Thus, the additive or impurity may penetrate the material to a certain depth dropping in intensity as the depth is increased. This method can be combined with another penetrating treatment, such as heat application. For example, by applying sulfur (or a peroxide, or a urethane crosslinker, or a metal oxide), or another additive to the exterior of a material from which to make the traction lug $58_i$ and applying heat thereto as well, the body may be made to have different levels of vulcanization at different depths, resulting in a variation of one or more properties with depth.

While a penetrating treatment may be applied to a single material, in some cases, multiple materials may be subjected to the penetrating treatment. For example, different materials having different sensitivity to the penetrating treatment may be provided at different depths to modify the effective area over which the penetrating treatment is effective and/or to alter the effect of the penetrating treatment. Alternatively or additionally, materials having a different reaction to the penetrating treatment may be placed in different locations within the traction lug $58_i$ so as to provide areas characterized by different gradients of a same or a different property.

As another example, in some embodiments, a continuous gradient of blowout resistance may be achieved by providing a large number of thin layers each of which differs from its neighbors by a small change in blowout resistance. This may result in a step function with a very fine granularity resembling a smooth function. By heating the thin layers, certain effects may take place at the layers' interfaces which may cause a smoothing of the step function. For instance, in some cases, when heated to a certain temperature (e.g., at or near a melting point of a material making up a layer), adjacent layers may intermix at their interface which may cause a smoothing of the step function of property variation, material from one layer may diffuse into that of another layer, and/or material from one layer may form cross-links with that of another layer.

iii. Discrete Gradient and Continuous Gradient

In some embodiments, the variation in blowout resistance and wear resistance defined by the arrangement of zones of different materials $60_1$-$60_Z$ of the traction lug $58_i$ may include at least one discrete gradient of blowout resistance and wear resistance, and at least one continuous gradient of blowout resistance and wear resistance. Certain ones of the zones of different materials $60_1$-$60_Z$ of the traction lug $58_i$ may be discrete zones that define a discrete gradient, while other ones of the zones of different materials $60_1$-$60_Z$ may be infinitesimal zones of different materials $60_1$-$60_Z$ that define a continuous gradient.

Figure 19:
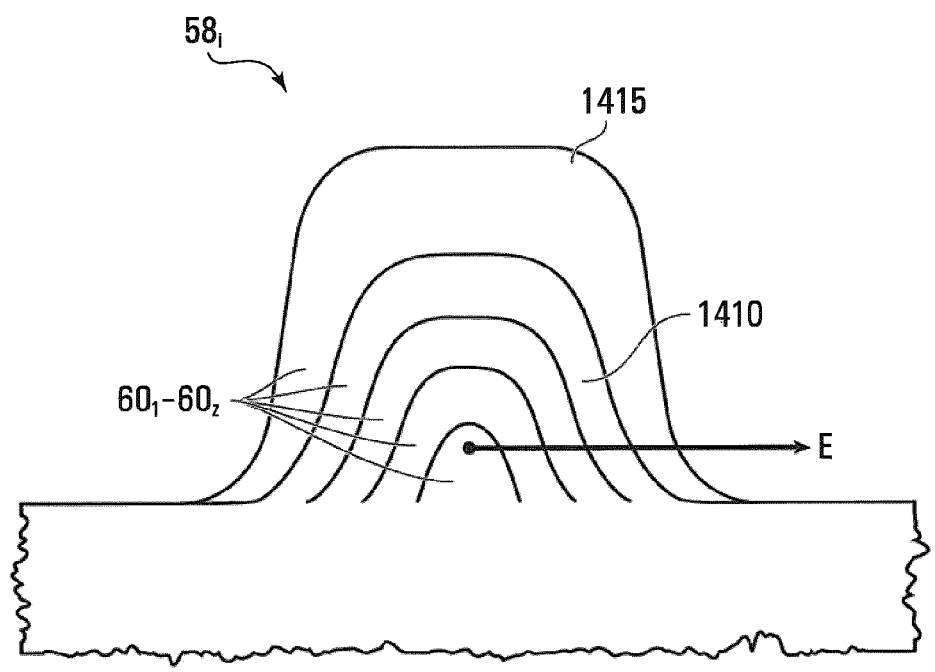
FIG. 19 shows another example of an embodiment of a traction projection of the track that comprises zones of different materials that vary in blowout resistance and wear resistance.

For instance, FIG. 19 illustrates an example of such an embodiment, where the zones of different materials $60_1$-$60_Z$ of the traction lug $58_i$ define an internal area 1410 and an external area 1415. The internal area 1410 defines a continuous gradient of blowout resistance and wear resistance, wherein the blowout resistance decreases along line E and the wear resistance increases along line E.

Various other combinations of discrete gradients and continuous gradients are possible in other embodiments (e.g., an outer spray-on or sheet layer with a continuous gradient in a remainder of the traction lug $58_i$).

iv. Characterization of Variation in Blowout Resistance and Wear Resistance

The variation in blowout resistance and wear resistance defined by arrangement of zones of different materials $60_1$-$60_Z$ of a traction lug $48_i$ may be characterized in various ways.

For example, a ratio $\lambda_i/\lambda_j$ of the blowout resistance $\lambda_i$ of a material $60_i$ and the blowout resistance $\lambda_j$ of another material $60_j$ that is less resistant to blowout than the material $60_i$ may take on various values. The blowout resistance of each of the materials $60_i$, $60_j$ may be measured by subjecting a sample of that material to a test as described above and measuring one or more parameters indicative of its blowout resistance, such as its blowout time B and/or its blowout temperature $T_b$ (e.g., under ASTM D-623 conditions). For instance, in some embodiments, a ratio $B_i/B_j$ of the blowout time of the material $60_i$ over the blowout time of the material $60_j$ may be at least 2, in some cases at least 3, in some cases at least 4, in some cases at least 5, in some cases at least 10, in some cases at least 15, and in some cases even more (e.g., at least 20, 30 or 40). Alternatively or additionally, in some embodiments, a ratio $T_{b-i}/T_{b-j}$ of the blowout temperature $T_{b-i}$ of the material $60_i$ over the blowout temperature $T_{b-j}$ of the material $60_j$ may be at least 1.1, in some cases at least 1.2, in some cases at least 1.3, in some cases at least 1.4, in some cases at least 1.5, in some cases at least 1.6, and in some cases even more (e.g., at least 2). By way of example, in the embodiment of FIG. 11, the ratio $B_2/B_1$ of the blowout time $B_2$ of the inner material $60_2$ and the blowout time $B_1$ of the outer material $60_1$ of the traction lug $48_i$ may be may be at least 2, in some cases at least 3, in some cases at least 4, in some cases at least 5, in some cases at least 10, in some cases at least 15, and in some cases even more (e.g., at least 20, 30 or 40), and/or the ratio $T_{b-2}/T_{b-1}$ of the blowout temperature $T_{b-2}$ of the inner material $60_2$ over the blowout temperature $T_{b-1}$ of the outer material $60_1$ may be at least 1.1, in some cases at least 1.2, in some cases at least 1.3, in some cases at least 1.4, in some cases at least 1.5, in some cases at least 1.6, in some cases at least 1.7, and in some cases even more (e.g., at least 2).

As another example, a ratio $A_j/A_i$ of the wear resistance $A_j$ of a material $60_j$ and the wear resistance $A_i$ of another material $60_i$ that is less resistant to wear than the material $60_j$ may take on various values. The wear resistance of each of the materials $60_i$, $60_j$ may be measured by subjecting a sample of that material to a test as described above and measuring one or more parameters indicative of its wear resistance, such as its abrasion resistance (e.g., under ASTM D-5963 conditions). For instance, in some embodiments, where each of the wear resistance $A_j$ of the material $60_j$ and the wear resistance $A_i$ of the material $60_i$ is its abrasion resistance expressed as a volumetric loss, the ratio $A_j/A_i$ may be no more than 0.9, in some cases no more than 0.8, in some cases no more than 0.7, in some cases no more than 0.6, in some cases no more than 0.5, and in some cases even less (e.g., no more than 0.4). By way of example, in the embodiment of FIG. 11, the ratio $A_1/A_2$ of the abrasion resistance $A_1$ of the outer material $60_1$ and the abrasion resistance $A_2$ of the inner material $60_2$ of the traction lug $48_i$ may be may be no more than 0.9, in some cases no more than 0.8, in some cases no more than 0.7, in some cases no more than 0.6, in some cases no more than 0.5, and in some cases even less (e.g., no more than 0.4).

As yet another example, in some embodiments, a size of one or more of the zones of different materials $60_1$-$60_Z$ of the traction lug $58_i$ may be considered. For instance, in some cases, a first one of the zones of different materials $60_1$-$60Z$ that is more inward than a second one of the zones of different materials $60_1$-$60Z$ may be thicker than the second one of the zones of different materials $60_1$-$60_Z$. For instance, an example of such an embodiment is shown in FIG. 14 where each of the inner zones $60_3$, $60_4$ is thicker than the outermost zone $60_8$ or the mid zone $60_5$. In some examples, an innermost one of the zones of different materials $60_1$-$60_Z$ may be a thickest one of the zones of different materials $60_1$-$60_Z$.

Although in embodiments discussed above the arrangement of zones of different materials $60_1$-$60_Z$ exhibits a variation of the blowout resistance and the wear resistance across the traction lug $58_i$, in other embodiments, the arrangement of zones of different materials $60_1$-$60_Z$ may exhibit a variation of one or more other material properties in addition to a variation of the blowout resistance and the wear resistance.

For example, in some embodiments, there may be a variation of a modulus of elasticity across the arrangement of zones of different materials $60_1$-$60_Z$. For instance, in some cases, the modulus of elasticity may increase inwardly. For example, in some cases, an outer material $60_y$ of the traction lug $58_i$ may have a lower modulus of elasticity (i.e., higher elasticity) than an inner material $60_x$ of the traction lug $58_i$. Due to the low modulus of elasticity near the periphery of the traction lug $58_i$, compressive forces applied on the traction lug $58_i$ on the ground may be absorbed by elastic deformation of the traction lug $58_i$ near its exterior by the higher elasticity of the material of the traction lug $58_i$ near its exterior. This may help to prevent or at least impede crack propagation within the traction lug $58_i$. While absorption of the impact and/or compressive forces applied to the traction lug $58_i$ may reduce cracking potential, excessive deformation of the traction lug $58_i$ may cause excessive strain on the traction lug $58_i$ that may lead to other problems, including blowout. The higher modulus of elasticity of the material deeper within the traction lug $58_i$ serves to rigidify the traction lug $58_i$ and thus prevent excessive deformation thereof. This may therefore help to prevent or at least impede cracking and/or other negative effects.

As another example, in some embodiments, there may be a variation of a tensile strength across the arrangement of zones of different materials $60_1$-$60_Z$. For instance, in some cases, the variation of the tensile strength may include an increase of the tensile strength inwardly such that a material $60_j$ is more inward and has a greater tensile strength than another material $60_i$. In other cases, the variation of the tensile strength may include an increase of the tensile strength outwardly such that a material $60_j$ is more outward and has a greater tensile strength than another material $60_i$.

As another example, in some embodiments, there may be a variation of a crack propagation resistance across the arrangement of zones of different materials $60_1$-$60_Z$. The crack propagation resistance of a material $60_x$, which can also be referred to a crack growth resistance, refers to a resistance of that material to crack propagation. For example, the crack propagation resistance of the material $60_x$ can be evaluated on a basis of a crack growth rate (e.g., in mm per number of cycles) measured using a suitable crack growth test (e.g., a pure-shear crack growth test) on the material $60_x$, such that the crack propagation resistance is inversely related to the crack growth rate (i.e., the lower the crack growth rate, the higher the crack propagation resistance). For instance, in some cases, the variation of the crack propagation resistance may include an increase of the crack propagation resistance outwardly such that a material $60_j$ is more outward and has a greater crack propagation resistance (i.e., a lower crack growth rate) than another material $60_i$. In other cases, the variation of the crack propagation resistance may include an increase of the crack propagation resistance inwardly such that a material $60_j$ is more inward and has a greater crack propagation resistance (i.e., a lower crack growth rate) than another material $60_i$.

Principles discussed above in respect of the variation of blowout resistance and wear resistance may therefore also apply to a desired variation of another material property. For instance, the examples of property variation characterization discussed above in respect of the blowout resistance λ or the wear resistance A can be expressed in terms of any desired material property P.

Figure 20:
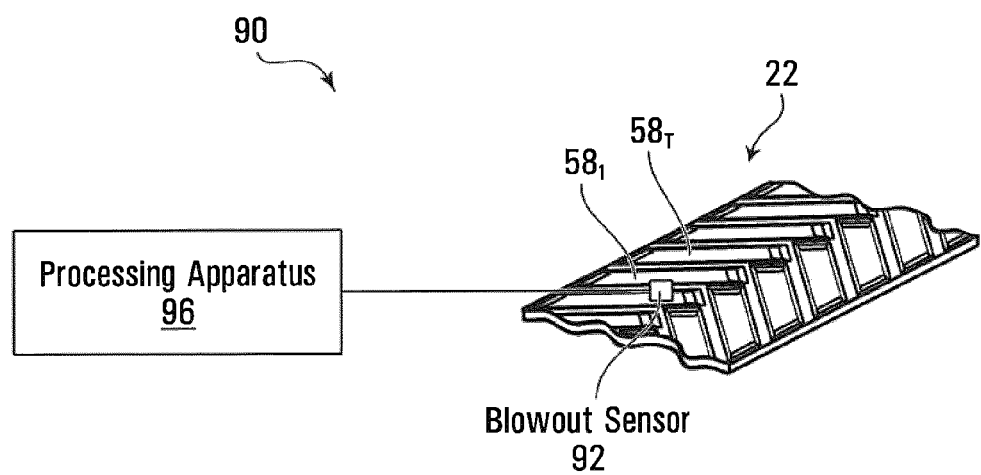
FIG. 20 shows an example of an embodiment of a blowout protection system of the tracked vehicle, comprising a processing apparatus and a blowout sensor.

In some embodiments, with additional reference to FIG. 20, in addition to or instead of enhancing the blowout resistance of the traction lugs $58_1$-$58_T$ as described above, the agricultural vehicle 10 may comprise a blowout protection system 90 to protect the track 22 against blowout of the traction lugs $58_1$-$58^T$. The blowout protection system 90 is configured to monitor the track 22 and act in respect of a potential occurrence of blowout of one or more of the traction lugs $58_1$-$58_T$, such as by providing information (e.g., a warning) regarding the potential occurrence of blowout of one or more of the traction lugs $58_1$-$58_T$ to the operator of the vehicle 10 or another individual who may take remedial action (e.g., stop or slow down the vehicle 10) and/or by automatically altering an operational state of the vehicle 10 (e.g., a speed of the vehicle 10 such as to stop or slow down the vehicle 10), before one or more of the traction lugs $58_1$-$58_T$ actually blowout.

More particularly, in this embodiment, the blowout protection system 90 comprises a blowout sensor 92 for monitoring the track 22 and a processing apparatus 96 connected to the sensor 92 and configured to issue a signal regarding a potential occurrence of blowout of one or more of the traction lugs $58_1$-$58_T$.

The sensor 92 is operable to sense a temperature or other physical characteristic of the track 22 that can be used to assess whether a blowout event is impending. To this end, in this embodiment, the sensor 92 is a temperature sensor to sense a temperature of the track 22. For instance, in various embodiments, the sensor 92 may include a thermistor, a thermocouple, a resistance temperature detector, or an infrared sensor. The sensor 92 may be any other suitable type of sensor in other embodiments to sense another physical characteristic of the track 22 that can be used to assess whether a blowout event is impending (e.g., a pressure sensor to sense a pressure within one or more of the traction lugs $58_1$-$58_T$).

Figure 21:
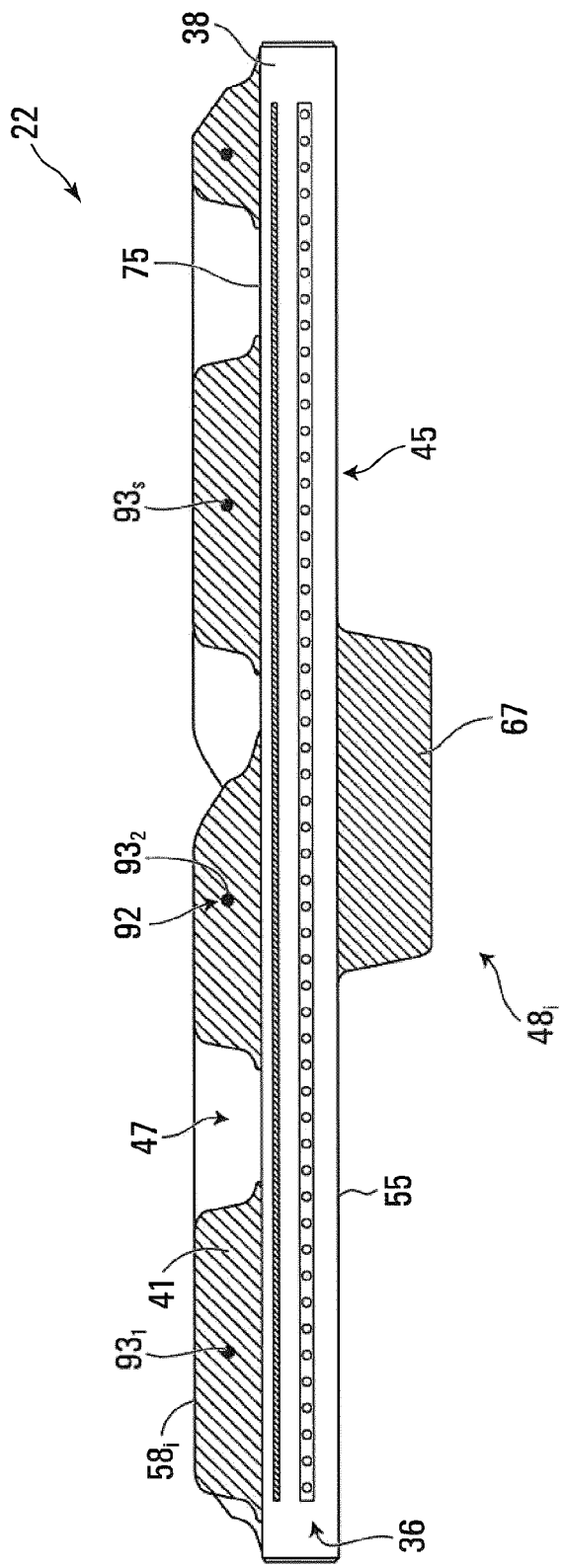
FIG. 21 shows an example of an embodiment in which the blowout sensor is incorporated in the track.

In some embodiments, the sensor 92 may be incorporated into the track 22. For example, in some embodiments, with additional reference to FIG. 21, the sensor 92 may comprise a plurality of sensing elements $93_1$-$93_S$ in respective ones of the traction lugs $58_1$-$58_T$. As such, the temperature may be assessed at respective ones of the traction lugs $58_1$-$58_T$.

In other embodiments, the sensor 92 may be external to the track 22. For instance, in some embodiments, the sensor 92 may be an infrared sensor operable to measure infrared light radiating from the track 22. In one example of implementation, the infrared sensor may be installed on the track-engaging assembly 21 such that it is able to measure the infrared light, and thus heat energy, emitted by the track 22.

The sensor 92 and the processing apparatus 96 may be connected in any suitable way. For example, in some embodiments, the sensor 92 and the processing apparatus 96 may be connected wirelessly. For instance, the sensor 92 may include a wireless transmitter that can wirelessly exchange data with a wireless receiver of the processing apparatus 96. In other embodiments, the sensor 92 and the processing apparatus 96 may be connected by a wire (e.g., the sensor 92 and the processing apparatus 96 may be separate devices connected by a cable or may be housed in a housing of a common device).

Figure 22:
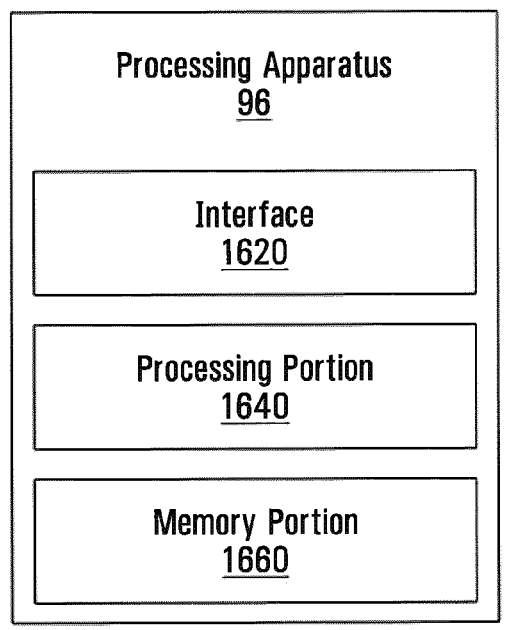
FIG. 22 shows an example of an embodiment of the processing apparatus.

As shown in FIG. 22, the processing apparatus 96 comprises suitable hardware and/or software configured to implement functionality of the processing apparatus 96. In this embodiment, the processing apparatus 96 comprises an interface 1620, a processing portion 1640, and a memory portion 1660.

The interface 1620 comprises one or more inputs and outputs allowing the processing apparatus 96 to receive signals from and send signals to other components to which the processing apparatus 96 is connected (i.e., directly or indirectly connected).

The processing portion 1640 comprises one or more processors for performing processing operations that implement functionality of the processing apparatus 96. A processor of the processing portion 1640 may be a general-purpose processor executing program code stored in the memory portion 1660. Alternatively, a processor of the processing portion 1640 may be a specific-purpose processor comprising one or more preprogrammed hardware or firmware elements (e.g., application-specific integrated circuits (ASICs), electrically erasable programmable read-only memories (EEPROMs), etc.) or other related elements.

The memory portion 1660 comprises one or more memories for storing program code executed by the processing portion 1640 and/or data used during operation of the processing portion 1640. A memory of the memory portion 1660 may be a semiconductor medium (including, e.g., a solid-state memory), a magnetic storage medium, an optical storage medium, and/or any other suitable type of memory. A memory of the memory portion 1660 may be read-only memory (ROM) and/or random-access memory (RAM), for example.

The processing apparatus 96 may be implemented in various other ways in other embodiments.

In some embodiments, two or more elements of the processing apparatus 96 may be implemented by devices that are physically distinct from one another and may be connected to one another via a bus (e.g., one or more electrical conductors or any other suitable bus) or via a communication link which may be wired, wireless, or both. In other embodiments, two or more elements of the processing apparatus 96 may be implemented by a single device.

Figure 23:
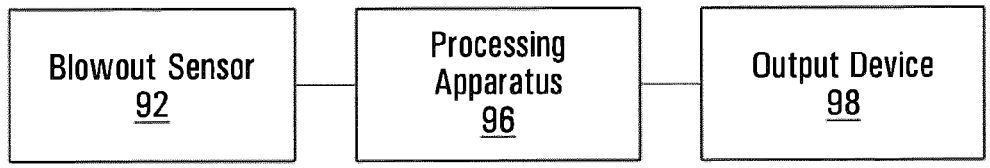
FIG. 23 shows an example of implementation in which the processing apparatus interacts with an output device.

With additional reference to FIG. 23, a signal issued by the processing apparatus 96 may be directed to an output device 98 for outputting information regarding a potential occurrence of blowout of the tractions lugs $58_1$-$58_T$.

The output device 98 may be implemented in various ways. For example, with additional reference to FIG. 24, in some embodiments, the output device 98 may comprise a display 100 that is part of the user interface of the operator cabin 20. The information regarding a potential occurrence of blowout of the traction lugs $58_1$-$58_T$ may thus be outputted as visual information on the display 100.

In some embodiments, the display 100 may present visual information that is continually provided. For instance, the display 100 may comprise a parameter reading 106 for indicating a physical quantity related to a potential occurrence of blowout of the traction lugs $58_1$-$58_T$. The parameter reading 106 is continually provided in that it is repeatedly updated to reflect a new parameter reading of the traction lugs $58_1$-$58_T$. In this example, the parameter reading 106 is a temperature reading 106 which indicates an average temperature of the traction lugs $58_1$-$58_T$. The temperature reading 106 may alternatively or additionally indicate a temperature of respective ones of the traction lugs $58_1$-$58_T$. In other embodiments, the parameter reading 106 may be any other suitable type of parameter reading (e.g., a pressure reading).

Figure 24:
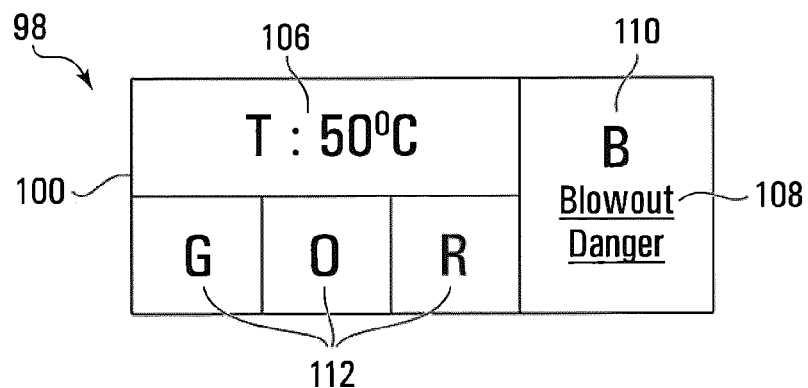
FIG. 24 shows an example of an embodiment in which the output device comprises a display.

Furthermore, in some embodiments, the display 100 may be operable to display a notification 110 to notify the operator when potential occurrence of blowout of one or more of the traction lugs $58_1$-$58_T$ is deemed to be impending. For example, the notification 110, which in FIG. 24 is illustrated as a "B", may be displayed on the display 100 when the sensor 92 detects a temperature or other physical characteristic indicative of potential blowout of one or more of the traction lugs $58_1$-$58_T$. In some embodiments, the display 100 may also be operable to display textual information 108 to inform the operator of any impending blowout occurrence. For example, the textual information 108 may read "blowout danger" to indicate a potential impending blowout occurrence or it may simply read "OK" to indicate that there is no potential impending blowout occurrence.

In some embodiments, the display 100 may also present graphical information 112 for notifying the operator when potential occurrence of blowout of one or more of the traction lugs $58_1$-$58_T$ is deemed to be impending. For instance, the graphical information 112 may include a color coded indicator with different colors attributed different meanings. For instance, the graphical information 112 may include a green indicator, an orange indicator and a red indicator (represented as "G", "O" and "R" in FIG. 24) each of which is indicative of a condition of the traction lugs $58_1$-$58_T$. In this case, the green indicator indicates that the traction lugs $58_1$-$58_T$ are in an acceptable condition, the orange indicator indicates that the traction lugs $58_1$-$58_T$ are beginning to show signs of potential blowout occurrence and the red indicator indicates that the traction lugs $58_1$-$58_T$ are in danger of blowing out. In order to assess the condition the traction lugs $58_1$-$58_T$ are in such as to be able to notify the operator of the condition via the graphical information 112, the processing apparatus 96 may implement a process which is further described below.

In other embodiments, the visual information indicating potential impending blowout of the traction lugs may simply be implemented by a light indicator on the control panel of the operator cabin 20. For example, the light indicator may turn on when it is considered that potential blowout is impending and may turn off when it is considered that there is no danger of blowout of the traction lugs $58_1$-$58^T$.

Figure 25:
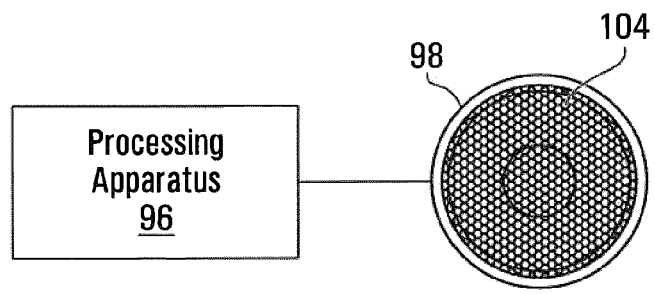
FIG. 25 shows an example of an embodiment in which the output device comprises a speaker.

In addition or alternatively to providing visual information, in some embodiments, the output device 98 may be operable to provide audible information to the operator of the vehicle 10. For instance, with additional reference to FIG. 25, in some embodiments, the output device 98 may comprise a speaker 104 for emitting sound indicative of the state of the traction lugs $58_1$-$58_T$. For example, the speaker 104 may communicate through an automated voice that the traction lugs $58_1$-$58_T$ are in danger of blowing out (e.g., "caution: blowout impending"). In other cases, the speaker 104 may simply emit a distinctive noise (e.g., an alert) indicative of an impending blowout of the traction lugs $58_1$-$58_T$.

The information regarding a potential occurrence of blowout of the traction lugs $58_1$-$58_T$ may be derived by comparing measured temperatures acquired through the sensor 92 to reference temperature data. For example, this may be the case where the information to be displayed is indicative of a condition of the traction lugs $58_1$-$58_T$ such as when displaying the graphical information 112 or issuing the visual notification 110 or the audible notification through the speaker 104. To this end, the processing apparatus 96 may have access to the reference temperature data (e.g., stored in the memory potion 1660) from which the condition of the traction lugs $58_1$-$58_T$ in respect of potential blowout occurrence may be derived. More specifically, the reference temperature data may define temperature ranges associated with a condition of the traction lugs $58_1$-$58_T$. For example, an "acceptable condition" may be defined by a temperature range including all temperatures below an accepted temperature $T_A$. The accepted temperature $T_A$ may be a temperature below which there is considered to be no danger for blowout for example. A "caution condition" may be defined by a temperature range between the accepted temperature $T_A$ and a blowout temperature $T_B$. The blowout temperature $T_B$ may be a temperature above which blowout of the traction lugs is considered imminent. Lastly, a "danger condition" may be defined by a temperature range including all temperatures above the blowout temperature $T_B$. Although three possible conditions were described (e.g., accepted, caution and danger), in some cases, more or less conditions may be identified.

Figure 26:
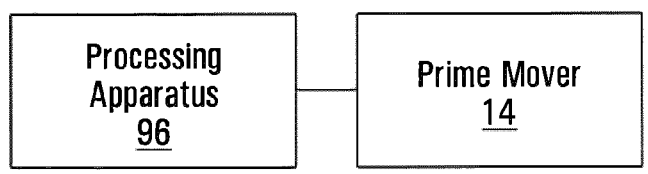
FIG. 26 shows a connection between the processing apparatus and a prime mover of the tracked vehicle.

In some embodiments, with additional reference to FIG. 26, a signal issued by the processing apparatus 96 may be directed to a powertrain (e.g., the prime mover 14) of the vehicle 10 for altering an operational state of the vehicle 10. For example, the signal issued may be configured to control the engine or hydraulic drive system of the vehicle 10 to reduce the speed of the vehicle 10, in order to stop it and/or to slow it down. For instance, if the processing apparatus 96 establishes that the traction lugs $58_1$-$58_T$ are in the "danger condition" as defined above, the signal issued by the processing apparatus 96 may control the engine of the vehicle 10 or any other component of the powertrain to slow down the vehicle 10.

Figure 27:
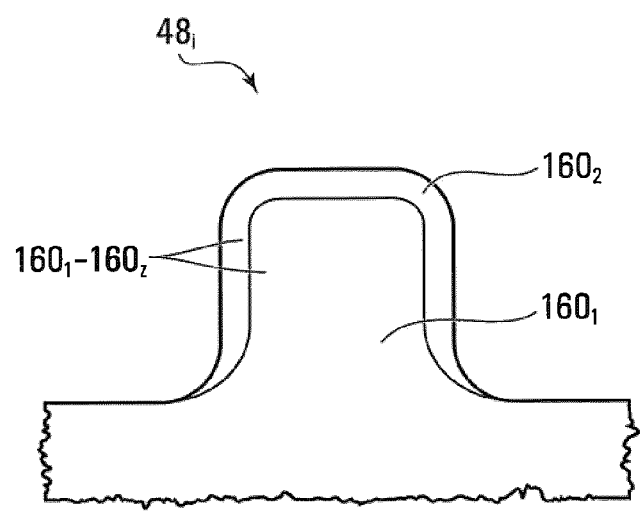
FIG. 27 shows an example of a drive/guide projection of the track that comprises zones of different materials varying in blowout resistance and wear resistance, in accordance with another embodiment of the invention.

While they have been described in respect of blowout or other deterioration of the traction lugs $58_1$-$58_T$, in some embodiments, solutions described herein in respect of the traction lugs $58_1$-$58_T$ may be similarly applied to the drive/guide lugs $48_1$-$48_N$. For example, in some embodiments, as shown in FIG. 27, a drive/guide lug $48_i$ may comprise an arrangement of zones of different materials $160_1$-$160Z$ exhibiting a desired variation in blowout resistance and wear resistance, similar to that described above in connection with the arrangement of zones of different materials $60_1$-$60_Z$ of a traction lug $58_i$. Thus, in this example, the blowout resistance of an inner material $160_1$ of the drive/guide lug $48_i$ is greater than the blowout resistance of an outer material $160_2$ of the drive/guide lug $48_i$ and the wear resistance of the outer material $160_2$ of the drive/guide lug $48_i$ is greater than the wear resistance of the inner material $160_1$ of the drive/guide lug $48_i$.

Each track system $16_i$ of the agricultural vehicle 10, including its track 22, may be configured in various other ways in other embodiments.

For example, each track system $16_i$ may comprise different and/or additional components in other embodiments. For example, in some embodiments, the track system $16_i$ may comprise a front drive wheel (e.g., the idler wheel 26 may be replaced by a drive wheel) instead of or in addition to the drive wheel 24. As another example, in some embodiments, the track system $16_i$ may comprise more or less roller wheels such as the roller wheels $28_1$-$28_6$. As yet another example, rather than have a generally linear configuration as in this embodiment, in other embodiments, the track system $16_i$ may have various other configurations (e.g., a generally triangular configuration with the axis of rotation of the drive wheel 24 located between the axes of rotations of leading and trailing idler wheels).

While in the embodiment considered above the off-road vehicle 10 is an agricultural vehicle, in other embodiments, the vehicle 10 may be an industrial vehicle such as a construction vehicle (e.g., a loader, a bulldozer, an excavator, etc.) for performing construction work or a forestry vehicle (e.g., a feller-buncher, a tree chipper, a knuckleboom loader, etc.) for performing forestry work, or a military vehicle (e.g., a combat engineering vehicle (CEV), etc.) for performing military work, or any other vehicle operable off paved roads. Although operable off paved roads, the vehicle 10 may also be operable on paved roads in some cases. Also, while in the embodiment considered above the vehicle 10 is driven by a human operator in the vehicle 10, in other embodiments, the vehicle 10 may be an unmanned ground vehicle (e.g., a teleoperated or autonomous unmanned ground vehicle).

In some examples of implementation, any feature of any embodiment described herein may be used in combination with any feature of any other embodiment described herein.

Certain additional elements that may be needed for operation of some embodiments have not been described or illustrated as they are assumed to be within the purview of those of ordinary skill in the art. Moreover, certain embodiments may be free of, may lack and/or may function without any element that is not specifically disclosed herein.

Although various embodiments and examples have been presented, this was for the purpose of describing, but not limiting, the invention. Various modifications and enhancements will become apparent to those of ordinary skill in the art and are within the scope of the invention, which is defined by the appended claims.

The invention claimed is:

1. A track for a vehicle, the track being mountable around a track-engaging assembly configured to move the track around the track-engaging assembly, the track-engaging assembly comprising a plurality of wheels for engaging the track, the track being elastomeric to flex around the track-engaging assembly, the track comprising:

a carcass having a ground-engaging outer surface and an inner surface opposite to the ground-engaging outer surface; and a plurality of traction projections projecting from the ground-engaging outer surface of the carcass and distributed in a longitudinal direction of the track, wherein at least one of the plurality of traction projections comprises:

a first material; and a second material disposed inwardly of the first material;
wherein at least one of:
a wear resistance of the first material is greater than a wear resistance of the second material;
a modulus of elasticity of the first material is different from a modulus of elasticity of the second material;
a tensile strength of the first material is different from a tensile strength of the second material;
a resistance to heat buildup of the first material is less than a resistance to heat buildup of the second material; and
a crack propagation resistance of the first material is greater than a crack propagation resistance of the second material;
wherein a ratio of a volume of the second material over a volume of the at least one of the plurality of traction lugs is at least 0.3; and
wherein an entirety of the second material projects outwardly from the ground engaging surface of the carcass.

2. The track of claim 1, further comprising a blowout sensor enclosed in an elastomeric material of the track, wherein the blowout sensor is configured to sense a characteristic of the track that is indicative of a potential deterioration of the track and/or a potential blowout of the track.

3. The track of claim 2, wherein at least part of the blowout sensor is disposed in a given one of the plurality of traction projections.

4. The track of claim 2, wherein the blowout sensor is configured to issue a signal processable by a processing apparatus to perform an action relating to the vehicle based on the characteristic of the track.

5. The track of claim 4, wherein the action relating to the vehicle is at least one of:
an action controlling a powertrain of the vehicle;
an action controlling a speed of the vehicle;
an action limiting the speed of the vehicle;
an action reducing the speed of the vehicle; and
an action causing a communication device to communicate information regarding the vehicle to a user of the communication device.

6. The track of claim 1, wherein the wear resistance of the first material is an abrasion resistance of the first material and the wear resistance of the second material is an abrasion resistance of the second material.

7. The track of claim 6, wherein the abrasion resistance of the first material and the abrasion resistance of the second material are expressed as a volumetric loss and a ratio of the abrasion resistance of the second material over the abrasion resistance of the first material is less than or equal to 0.9, less than or equal to 0.7, or less than or equal to 0.5.

8. The track of claim 1, wherein an abrasion resistance at a periphery of the at least one of the plurality of projections is expressed as a volumetric loss of less than or equal to 110 mm$^3$, less than or equal to 90 mm$^3$, or less than or equal to 70 mm$^3$.

9. The track of claim 1, wherein a blowout temperature of the at least one of the plurality of projections are at least 180° C., at least 190° C., at least 200° C., or at least 210° C.;
wherein the blowout temperature of the at least one of the plurality of projections is determined by:
subjecting a dimension of the at least one of the plurality of projections having a diameter of 17.8+/−0.1 mm and a height of 25+/−0.15 mm to a preload of 110 pounds conditioned at 100° C. for 25 minutes and repeatedly compressing 0.250 inches in amplitude at a frequency of 30 Hz; and
measuring a temperature of a hottest point of the dimension, wherein the blowout temperature is the temperature of the hottest point of the dimension.

10. The track of claim 1, wherein the at least one of the plurality of projections comprises a plurality of zones of material extending from an outer layer comprising the first material and an inner layer comprising the second material, wherein at least one of:
a gradient of blowout resistance of the plurality of zones of material increases from the outer layer to the inner layer;
a gradient of wear resistance of the plurality of zones of material decreases incrementally from the outer layer to the inner layer;
a gradient of modulus of elasticity of the plurality of zones of material increases incrementally from the outer layer to the inner layer;
a gradient of tensile strength of the plurality of zones of material decreases incrementally from the outer layer to the inner layer;
a gradient of tensile strength of the plurality of zones of material increases incrementally from the outer layer to the inner layer; and
a gradient of crack propagation resistance of the plurality of zones of material decreases incrementally from the outer layer to the inner layer.

11. The track of claim 10, wherein at least one of the gradient of blowout resistance and the gradient of wear resistance is a discrete gradient, a continuous gradient, or at least one discrete gradient and at least one continuous gradient.

12. The track of claim 10, wherein each of the plurality of zones of material comprise an interlocking protuberance that engages with a corresponding interlocking groove on an adjacent one of the plurality of zones of material.

13. The track of claim 10, wherein each of the plurality of zones of material are equal in thickness.

14. The track of claim 10, wherein one or more of the plurality of zones of material has a different thickness from a second one or more of the plurality of zones of material.

15. The track of claim 1, wherein the first material comprises a thermoplastic and/or the second material comprises metal, a rigid polymer, or a ceramic.

16. The track of claim 1, wherein at least one of:
the ratio of the volume of the second material over the volume of the at least one of the plurality of traction lugs is at least 0.4, at least 0.5, or at least 0.6.

17. The track of claim 1, wherein the modulus of elasticity of the first material is less than the modulus of elasticity of the second material.

18. The track of claim 1, wherein the tensile strength of the first material is less than the tensile strength of the second material.

19. The track of claim 1, wherein a blowout temperature of the second material is different than a blowout temperature of the first material;
wherein the blowout temperature of the first material and the blowout temperature of the second material are each determined by:
subjecting a dimension of the first material or the second material to a specified preload conditioned for a specific period of time and repeatedly compressing at a frequency; and
measuring a temperature of a hottest point of the dimension, wherein the temperature of the hottest point of the dimension of the first material is the blowout temperature of the first material and the temperature of the hottest point of the dimension of the second material is the blowout temperature of the second material.

20. The track of claim 19, wherein the blowout temperature of the second material is higher than the blowout temperature of the first material.

* * * * *

UNITED STATES PATENT AND TRADEMARK OFFICE
CERTIFICATE OF CORRECTION

PATENT NO. : 11,897,558 B2
APPLICATION NO. : 16/989823
DATED : February 13, 2024
INVENTOR(S) : Patrice Boily et al.

Page 1 of 1

It is certified that error appears in the above-identified patent and that said Letters Patent is hereby corrected as shown below:

In the Specification
Column 11, Line 11 the phrase "$60_1$-$60Z$" should be replaced with "$60_1$-$60_z$"
Column 18, Line 52 the phrase "$60_1$-$60Z$" should be replaced with "$60_1$-$60_z$"
Column 19, Line 15 the phrase "$60_1$-$60Z$" should be replaced with "$60_1$-$60_z$"
Column 19, Line 40 the phrase "$60_1$-$60Z$" should be replaced with "$60_1$-$60_z$"
Column 19, Line 50 the phrase "$60_1$-$60Z$" should be replaced with "$60_1$-$60_z$"
Column 22, Line 9 the phrase "$60_1$-$60Z$" should be replaced with "$60_1$-$60_z$"
Column 23, Line 61 the phrase "$60_{-1}$-$60_z$" should be replaced with "$60_1$-$60_z$"
Column 25, Line 11 the phrase "$60_1$-$60Z$" should be replaced with "$60_1$-$60_z$"
Column 25, Line 13 the phrase "$60_1$-$60Z$" should be replaced with "$60_1$-$60_z$"
Column 25, Line 25 the phrase "$60_{-1}$-$60_z$" should be replaced with "$60_1$-$60_z$"
Column 26, Line 31 the phrase "$58_1$-$58^T$" should be replaced with "$58_1$-$58_T$"
Column 28, Line 64 the phrase "$58_1$-$58^T$" should be replaced with "$58_1$-$58_T$"
Column 29, Line 60 the phrase "$60_1$-$60Z$" should be replaced with "$60_1$-$60_z$"

In the Claims
Claim 16, Column 32, Line 46 the phrase "at least one of" should be deleted so that the claim reads as follows:
"The track of claim 1, wherein: the ratio of the volume of the second material over the volume of the at least one of the plurality of traction lugs is at least 0.4, at least 0.5, or at least 0.6."

Signed and Sealed this
Sixteenth Day of April, 2024

Katherine Kelly Vidal
*Director of the United States Patent and Trademark Office*